US008282754B2

(12) United States Patent
Lorence et al.

(10) Patent No.: US 8,282,754 B2
(45) Date of Patent: Oct. 9, 2012

(54) PRESSURE SENSITIVE SHRINK LABEL

(75) Inventors: James Paul Lorence, Concord, OH (US); Richard D. Pastor, Chardon, OH (US); Craig William Potter, Mentor, OH (US); Richard A. Previty, Chardon, OH (US); Mitchell J. Rackovan, Madison, OH (US); Mark James Wyatt, Chino Hills, CA (US); William Lewis Cone, Weeki Wachee, FL (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 12/237,737

(22) Filed: Sep. 25, 2008

(65) Prior Publication Data
US 2009/0038736 A1 Feb. 12, 2009

Related U.S. Application Data

(63) Continuation-in-part of application No. PCT/US2008/059397, filed on Apr. 4, 2008.

(60) Provisional application No. 60/910,282, filed on Apr. 5, 2007, provisional application No. 60/938,019, filed on May 15, 2007.

(51) Int. Cl.
*B32B 37/14* (2006.01)
(52) U.S. Cl. .................. 156/86; 156/84; 156/85
(58) Field of Classification Search ............ 156/84, 156/86
See application file for complete search history.

(56) References Cited

U.S. PATENT DOCUMENTS

| 2,356,951 | A | | 8/1944 | Runton et al. |
| 3,434,902 | A | * | 3/1969 | Bliss ........................... 156/230 |
| 3,586,580 | A | | 6/1971 | Dullinger |
| 3,718,495 | A | | 2/1973 | Tomita |
| 3,769,147 | A | | 10/1973 | Komendat et al. |
| 3,802,942 | A | | 4/1974 | Amberg et al. |
| 3,823,050 | A | | 7/1974 | La Mers |
| 3,834,607 | A | | 9/1974 | Muylle |
| 3,884,396 | A | | 5/1975 | Gordon et al. |
| 3,908,827 | A | | 9/1975 | Bemmels et al. |
| 3,923,198 | A | | 12/1975 | Brochman |
| 3,953,635 | A | | 4/1976 | Dunning |
| 4,007,067 | A | | 2/1977 | Dunning |
| 4,011,122 | A | | 3/1977 | Ashcroft |
| 4,021,285 | A | | 5/1977 | Amberg |
| 4,025,381 | A | | 5/1977 | Amberg |
| 4,139,099 | A | | 2/1979 | Daly et al. |

(Continued)

FOREIGN PATENT DOCUMENTS
DE  1786009  11/1971
(Continued)

OTHER PUBLICATIONS

Reply to ISA Written Opinion and Article 19 Amendment of Claims; PCT/US2008/059397—Oct. 16, 2008.

(Continued)

*Primary Examiner* — Khanh P Nguyen
*Assistant Examiner* — Margaret Squalls
(74) *Attorney, Agent, or Firm* — Avery Dennison Corporation

(57) ABSTRACT

A label for application to a surface having at least one compound curve is provided. The label comprises a heat shrinkable film having an inner surface and outer surface and a layer of pressure sensitive adhesive on the inner surface of the heat shrinkable film.

25 Claims, 15 Drawing Sheets

U.S. PATENT DOCUMENTS

| | | | |
|---|---|---|---|
| 4,172,163 A | 10/1979 | Magnotta | |
| 4,188,249 A | 2/1980 | Fujio | |
| 4,198,560 A * | 4/1980 | Dietrich | 219/388 |
| 4,210,621 A * | 7/1980 | Snover et al. | 264/516 |
| 4,214,937 A | 7/1980 | Geustsen et al. | |
| 4,217,263 A | 8/1980 | Magnotta | |
| 4,225,049 A | 9/1980 | Inoue | |
| 4,240,854 A | 12/1980 | Massey et al. | |
| 4,250,686 A | 2/1981 | Fujio | |
| 4,275,856 A | 6/1981 | Harvey | |
| 4,286,421 A | 9/1981 | Fujito | |
| 4,287,700 A | 9/1981 | Fujio | |
| 4,290,992 A | 9/1981 | Fujio | |
| 4,293,364 A | 10/1981 | Fujio | |
| 4,300,974 A | 11/1981 | Bauer | |
| 4,313,986 A | 2/1982 | Magnotta | |
| 4,343,856 A | 8/1982 | Goswami et al. | |
| 4,410,011 A | 10/1983 | Andrii et al. | |
| 4,427,744 A | 1/1984 | Hume, III | |
| 4,486,366 A | 12/1984 | Reddy | |
| 4,497,275 A | 2/1985 | Johnson et al. | |
| 4,511,425 A * | 4/1985 | Boyd et al. | 156/493 |
| 4,518,468 A | 5/1985 | Fotland et al. | |
| 4,536,434 A | 8/1985 | Magnotta | |
| 4,566,933 A * | 1/1986 | Crankshaw et al. | 156/444 |
| 4,585,679 A | 4/1986 | Karabedian | |
| 4,595,544 A | 6/1986 | Maruyama et al. | |
| 4,629,663 A | 12/1986 | Brown et al. | |
| 4,699,842 A | 10/1987 | Jorgensen et al. | |
| 4,714,515 A * | 12/1987 | Hoffmann | 156/450 |
| 4,732,641 A * | 3/1988 | Nechay et al. | 156/448 |
| 4,735,664 A | 4/1988 | Asghar et al. | |
| 4,801,348 A | 1/1989 | Takagaki | |
| 4,801,514 A | 1/1989 | Will et al. | |
| 4,822,631 A | 4/1989 | Beaudet | |
| 4,831,799 A | 5/1989 | Glover et al. | |
| 4,832,783 A | 5/1989 | Nechay et al. | |
| 4,835,217 A | 5/1989 | Jorgensen et al. | |
| 4,844,962 A | 7/1989 | May et al. | |
| 4,863,768 A | 9/1989 | Ishio et al. | |
| 4,871,553 A | 10/1989 | Huhndorff | |
| 4,872,931 A | 10/1989 | Mitchell | |
| 4,874,454 A | 10/1989 | Talalay et al. | |
| 4,874,665 A | 10/1989 | Doheny | |
| 4,910,941 A | 3/1990 | Nagano et al. | |
| 4,911,994 A | 3/1990 | Will et al. | |
| 4,923,557 A * | 5/1990 | Dickey | 156/86 |
| 4,924,714 A | 5/1990 | Gross | |
| 4,950,344 A | 8/1990 | Glover et al. | |
| 4,956,963 A | 9/1990 | Johnson | |
| 4,961,978 A | 10/1990 | Doheny, Jr. et al. | |
| 4,963,418 A | 10/1990 | Isaka et al. | |
| 4,982,872 A | 1/1991 | Avery | |
| 4,983,238 A | 1/1991 | Yoshida et al. | |
| 4,997,239 A | 3/1991 | Crisp et al. | |
| 5,021,204 A | 6/1991 | Frost et al. | |
| 5,022,941 A | 6/1991 | Doheny, Jr. et al. | |
| 5,032,477 A | 7/1991 | Will et al. | |
| 5,043,204 A | 8/1991 | Itaba et al. | |
| 5,069,953 A | 12/1991 | Kishikawa et al. | |
| 5,070,680 A | 12/1991 | Nagano | |
| 5,071,167 A | 12/1991 | O'Brien | |
| 5,091,237 A | 2/1992 | Schloegl et al. | |
| 5,102,733 A | 4/1992 | Zawadzki | |
| 5,111,953 A | 5/1992 | Faust et al. | |
| 5,132,074 A | 7/1992 | Isozaki et al. | |
| 5,135,261 A | 8/1992 | Cusack et al. | |
| 5,143,570 A | 9/1992 | Freedman | |
| 5,145,728 A | 9/1992 | Itaba et al. | |
| 5,147,040 A | 9/1992 | Koike et al. | |
| 5,158,815 A | 10/1992 | Doheny, Jr. et al. | |
| 5,158,836 A | 10/1992 | Schirmer et al. | |
| 5,164,444 A | 11/1992 | Bernard | |
| 5,167,974 A | 12/1992 | Grindrod et al. | |
| 5,169,714 A | 12/1992 | Kondo et al. | |
| 5,173,266 A | 12/1992 | Kenney | |
| 5,176,948 A | 1/1993 | Nguyen et al. | |
| 5,183,841 A | 2/1993 | Bernard | |
| 5,186,782 A | 2/1993 | Freedman | |
| 5,187,235 A | 2/1993 | Bordoloi et al. | |
| 5,189,126 A | 2/1993 | Bernard | |
| 5,190,609 A | 3/1993 | Lin et al. | |
| 5,196,504 A | 3/1993 | Scholz et al. | |
| 5,212,009 A | 5/1993 | Peiffer et al. | |
| 5,219,666 A | 6/1993 | Schirmer et al. | |
| 5,221,706 A | 6/1993 | Lee et al. | |
| 5,234,733 A | 8/1993 | Schloegl et al. | |
| 5,234,736 A | 8/1993 | Lee | |
| 5,240,989 A | 8/1993 | Bernard et al. | |
| 5,242,650 A | 9/1993 | Rackovan et al. | |
| 5,245,456 A | 9/1993 | Yoshimi et al. | |
| 5,246,762 A | 9/1993 | Namamura | |
| 5,252,155 A | 10/1993 | Nowicki et al. | |
| 5,262,216 A | 11/1993 | Popat et al. | |
| 5,262,251 A | 11/1993 | Will et al. | |
| 5,264,532 A | 11/1993 | Bernard | |
| 5,290,842 A | 3/1994 | Sasaki et al. | |
| 5,292,561 A | 3/1994 | Peiffer et al. | |
| 5,296,081 A | 3/1994 | Morin et al. | |
| 5,298,708 A | 3/1994 | Babu et al. | |
| 5,300,353 A | 4/1994 | Yoshimura et al. | |
| 5,302,402 A | 4/1994 | Dudenhoeffer et al. | |
| 5,306,549 A | 4/1994 | Isozaki et al. | |
| 5,312,712 A | 5/1994 | Will et al. | |
| 5,316,344 A | 5/1994 | Popat et al. | |
| 5,318,815 A | 6/1994 | Newing et al. | |
| 5,322,876 A | 6/1994 | Sasaki et al. | |
| 5,326,644 A | 7/1994 | Scholz et al. | |
| 5,326,654 A | 7/1994 | Will et al. | |
| 5,346,259 A | 9/1994 | Mocilnikar et al. | |
| 5,358,804 A | 10/1994 | Will et al. | |
| 5,366,575 A | 11/1994 | Staff et al. | |
| 5,376,394 A | 12/1994 | Dudenhoeffer et al. | |
| 5,383,568 A | 1/1995 | Tusick et al. | |
| 5,385,965 A | 1/1995 | Bernard et al. | |
| 5,390,477 A * | 2/1995 | Sowden | 53/557 |
| 5,397,615 A | 3/1995 | Van Beersel et al. | |
| 5,403,416 A | 4/1995 | Bright et al. | |
| 5,403,454 A | 4/1995 | Taniguchi et al. | |
| 5,407,718 A | 4/1995 | Popat et al. | |
| 5,407,752 A | 4/1995 | Fukuzumi et al. | |
| 5,411,295 A | 5/1995 | Bates et al. | |
| 5,417,901 A | 5/1995 | Hartman et al. | |
| 5,420,195 A | 5/1995 | Mayer et al. | |
| 5,421,932 A | 6/1995 | Fujio | |
| 5,428,209 A | 6/1995 | Babu et al. | |
| 5,443,765 A | 8/1995 | Yoshimura et al. | |
| 5,443,895 A | 8/1995 | Peiffer et al. | |
| 5,460,878 A | 10/1995 | Hostetter | |
| 5,466,499 A | 11/1995 | Takagi et al. | |
| 5,477,192 A | 12/1995 | Black et al. | |
| 5,478,422 A | 12/1995 | Bright et al. | |
| 5,490,658 A | 2/1996 | Coward et al. | |
| 5,491,017 A | 2/1996 | Todt | |
| 5,492,950 A | 2/1996 | Brown et al. | |
| 5,516,393 A | 5/1996 | Freedman | |
| 5,536,787 A | 7/1996 | Scholz et al. | |
| 5,536,800 A | 7/1996 | Scholz et al. | |
| 5,544,770 A | 8/1996 | Travisano | |
| 5,558,913 A | 9/1996 | Sasaki et al. | |
| 5,563,205 A | 10/1996 | Mayer et al. | |
| 5,565,055 A | 10/1996 | Croci | |
| 5,585,193 A | 12/1996 | Josephy et al. | |
| 5,593,747 A * | 1/1997 | Georgelos | 428/36.7 |
| 5,597,654 A | 1/1997 | Scholz et al. | |
| 5,607,790 A | 3/1997 | Hughen et al. | |
| 5,614,333 A | 3/1997 | Hughen et al. | |
| 5,618,033 A | 4/1997 | Owen et al. | |
| 5,623,011 A | 4/1997 | Bernard | |
| 5,653,927 A | 8/1997 | Flynn et al. | |
| 5,663,228 A | 9/1997 | Sasaki et al. | |
| 5,665,443 A | 9/1997 | Hata et al. | |
| 5,683,774 A | 11/1997 | Faykish et al. | |
| 5,688,456 A | 11/1997 | Kuriu et al. | |
| 5,690,628 A | 11/1997 | Huskey et al. | |
| 5,691,043 A | 11/1997 | Keller et al. | |
| 5,705,551 A | 1/1998 | Sasaki et al. | |

| | | | |
|---|---|---|---|
| 5,709,770 A | 1/1998 | Asghar et al. | |
| 5,709,937 A | 1/1998 | Adams et al. | |
| 5,712,031 A | 1/1998 | Kelch et al. | |
| 5,713,567 A | 2/1998 | Owen et al. | |
| 5,718,958 A | 2/1998 | Scholz et al. | |
| 5,721,041 A | 2/1998 | Baratto | |
| 5,725,966 A | 3/1998 | Abe et al. | |
| 5,726,220 A | 3/1998 | Tokushige et al. | |
| 5,728,440 A | 3/1998 | Good | |
| 5,728,469 A | 3/1998 | Mann et al. | |
| 5,733,615 A | 3/1998 | Rackovan et al. | |
| 5,741,563 A | 4/1998 | Mehta et al. | |
| 5,747,192 A | 5/1998 | Hughen et al. | |
| 5,753,326 A | 5/1998 | Blackwelder | |
| 5,759,337 A | 6/1998 | Fujio et al. | |
| 5,759,675 A | 6/1998 | Hamada et al. | |
| 5,766,795 A | 6/1998 | Will et al. | |
| 5,806,153 A | 9/1998 | Dolan et al. | |
| 5,817,426 A | 10/1998 | Spada et al. | |
| 5,827,609 A | 10/1998 | Ercillo et al. | |
| 5,830,571 A | 11/1998 | Mann et al. | |
| 5,833,273 A | 11/1998 | Strenk et al. | |
| 5,843,362 A | 12/1998 | Yoshii et al. | |
| 5,843,549 A | 12/1998 | Mingus | |
| 5,846,451 A | 12/1998 | Nakano et al. | |
| 5,851,610 A | 12/1998 | Ristey et al. | |
| 5,851,615 A | 12/1998 | Kay | |
| 5,856,387 A | 1/1999 | Sasaki et al. | |
| 5,859,116 A | 1/1999 | Shih | |
| 5,865,331 A | 2/1999 | Jacobs | |
| 5,866,634 A | 2/1999 | Tokushige et al. | |
| 5,869,160 A | 2/1999 | Mason et al. | |
| 5,876,816 A | 3/1999 | Freedman | |
| 5,878,554 A | 3/1999 | Loree et al. | |
| 5,879,496 A * | 3/1999 | Bright et al. | 156/86 |
| 5,884,425 A | 3/1999 | Baldwin | |
| 5,891,537 A | 4/1999 | Yoshii et al. | |
| 5,892,892 A | 4/1999 | Popat et al. | |
| 5,897,722 A * | 4/1999 | Bright | 156/86 |
| 5,900,091 A | 5/1999 | Kenney | |
| 5,904,804 A | 5/1999 | Kouda et al. | |
| 5,904,973 A | 5/1999 | Coward et al. | |
| 5,908,694 A | 6/1999 | Makar et al. | |
| 5,914,165 A | 6/1999 | Freedman | |
| 5,925,432 A | 7/1999 | Kian et al. | |
| 5,935,730 A | 8/1999 | Will et al. | |
| 5,948,517 A | 9/1999 | Adamko et al. | |
| 5,952,122 A | 9/1999 | Shacklett, III | |
| 5,954,907 A | 9/1999 | LaRose et al. | |
| 5,961,766 A | 10/1999 | Chang et al. | |
| 5,972,444 A | 10/1999 | Patel et al. | |
| 5,976,691 A | 11/1999 | Noguchi et al. | |
| 5,982,284 A | 11/1999 | Baldwin et al. | |
| 5,985,075 A | 11/1999 | Freedman | |
| 5,990,400 A | 11/1999 | Hoshino et al. | |
| 5,993,961 A | 11/1999 | Ugolick et al. | |
| 5,998,018 A | 12/1999 | Murakami et al. | |
| 6,004,682 A | 12/1999 | Rackovan et al. | |
| 6,016,618 A | 1/2000 | Attia et al. | |
| 6,016,641 A | 1/2000 | Nagano | |
| 6,025,079 A | 2/2000 | Ciocca et al. | |
| 6,042,930 A | 3/2000 | Kelch et al. | |
| 6,070,750 A | 6/2000 | Kubitz | |
| 6,074,747 A | 6/2000 | Scholz et al. | |
| 6,083,338 A | 7/2000 | Scholz et al. | |
| 6,099,927 A | 8/2000 | Freedman | |
| 6,107,411 A | 8/2000 | Toya et al. | |
| 6,113,838 A | 9/2000 | Flynn et al. | |
| 6,113,996 A | 9/2000 | Amon et al. | |
| 6,127,024 A | 10/2000 | Weiss et al. | |
| 6,150,013 A | 11/2000 | Balaji et al. | |
| 6,156,252 A | 12/2000 | Freedman | |
| 6,165,609 A | 12/2000 | Curatolo | |
| 6,176,966 B1 | 1/2001 | Tsujimoto et al. | |
| 6,183,862 B1 | 2/2001 | Ko et al. | |
| 6,187,432 B1 | 2/2001 | Krish et al. | |
| 6,194,501 B1 | 2/2001 | Okada et al. | |
| 6,197,419 B1 | 3/2001 | Hyde et al. | |
| 6,209,605 B1 | 4/2001 | Lee et al. | |
| 6,210,524 B1 | 4/2001 | Josephy | |
| 6,225,194 B1 | 5/2001 | Noguchi et al. | |
| 6,231,958 B1 | 5/2001 | Kim et al. | |
| 6,248,427 B1 | 6/2001 | Ast | |
| 6,254,712 B1 | 7/2001 | Enlow et al. | |
| 6,270,866 B1 | 8/2001 | Okuda et al. | |
| 6,270,871 B1 | 8/2001 | Scholz et al. | |
| 6,277,740 B1 | 8/2001 | Goldstein | |
| 6,280,557 B1 | 8/2001 | Peloquin et al. | |
| 6,284,337 B1 | 9/2001 | Lorimor et al. | |
| 6,284,338 B1 | 9/2001 | Bauman et al. | |
| 6,293,037 B1 | 9/2001 | Spada et al. | |
| 6,294,111 B1 | 9/2001 | Shacklett, III et al. | |
| 6,294,236 B1 | 9/2001 | Freedman | |
| 6,296,129 B1 | 10/2001 | Kawasaki | |
| 6,296,732 B1 | 10/2001 | Enlow et al. | |
| 6,299,716 B1 | 10/2001 | Bettinger | |
| 6,299,956 B1 | 10/2001 | Freedman | |
| 6,299,975 B1 | 10/2001 | Takahira et al. | |
| 6,312,800 B1 | 11/2001 | Noguchi et al. | |
| 6,322,883 B1 | 11/2001 | Williams | |
| 6,325,879 B1 | 12/2001 | Heckman et al. | |
| 6,329,113 B1 | 12/2001 | Bourdelais et al. | |
| 6,336,988 B1 | 1/2002 | Enlow et al. | |
| 6,342,281 B2 | 1/2002 | Hayakawa et al. | |
| 6,344,269 B1 | 2/2002 | Makar et al. | |
| 6,352,768 B1 | 3/2002 | Hseih et al. | |
| 6,358,587 B1 | 3/2002 | Saint et al. | |
| 6,372,074 B1 | 4/2002 | Holguin et al. | |
| 6,376,069 B1 | 4/2002 | Bilodeau et al. | |
| 6,383,627 B2 | 5/2002 | Hashimoto et al. | |
| 6,398,892 B1 | 6/2002 | Noguchi et al. | |
| 6,413,596 B1 | 7/2002 | Okuda et al. | |
| 6,416,858 B1 | 7/2002 | Ercillo et al. | |
| 6,417,307 B1 | 7/2002 | Oi et al. | |
| 6,418,995 B1 | 7/2002 | Sadrakula et al. | |
| 6,423,406 B1 | 7/2002 | Bilodeau | |
| 6,436,496 B1 | 8/2002 | Rackovan et al. | |
| 6,436,501 B1 | 8/2002 | Steadman | |
| 6,436,795 B2 | 8/2002 | Noguchi et al. | |
| 6,461,555 B1 | 10/2002 | Freedman | |
| 6,461,706 B1 | 10/2002 | Freedman et al. | |
| 6,461,707 B1 | 10/2002 | Scholz et al. | |
| 6,485,803 B1 | 11/2002 | Bright | |
| 6,489,387 B2 | 12/2002 | Mallya et al. | |
| 6,503,620 B1 | 1/2003 | Xie et al. | |
| 6,509,087 B2 | 1/2003 | Uehara et al. | |
| 6,524,669 B2 | 2/2003 | Ito et al. | |
| 6,525,129 B1 | 2/2003 | Su et al. | |
| 6,534,189 B1 | 3/2003 | Burns et al. | |
| 6,540,865 B1 | 4/2003 | Miekka et al. | |
| 6,541,098 B2 | 4/2003 | Venkatasanthanam et al. | |
| 6,547,887 B1 | 4/2003 | Ko et al. | |
| 6,547,912 B2 | 4/2003 | Enlow et al. | |
| 6,553,700 B1 | 4/2003 | Hirayama et al. | |
| 6,562,402 B2 | 5/2003 | Scholz et al. | |
| 6,579,915 B2 | 6/2003 | Kroll et al. | |
| 6,581,972 B2 | 6/2003 | Nojima et al. | |
| 6,602,790 B2 | 8/2003 | Kian et al. | |
| 6,616,727 B1 | 9/2003 | Koyama et al. | |
| 6,627,283 B1 | 9/2003 | Freedman | |
| 6,638,582 B1 | 10/2003 | Uchiyama et al. | |
| 6,649,259 B1 | 11/2003 | Hu et al. | |
| 6,663,928 B2 | 12/2003 | Ito et al. | |
| 6,663,947 B2 | 12/2003 | Freedman et al. | |
| 6,680,097 B1 | 1/2004 | Amberger et al. | |
| 6,691,439 B1 | 2/2004 | Miyashita et al. | |
| 6,702,910 B2 | 3/2004 | Noguchi et al. | |
| 6,706,355 B2 | 3/2004 | Holguin et al. | |
| 6,709,761 B2 | 3/2004 | Hirose et al. | |
| 6,716,501 B2 | 4/2004 | Kovalchuk et al. | |
| 6,718,223 B1 | 4/2004 | Iwakata et al. | |
| 6,720,085 B2 | 4/2004 | Ito et al. | |
| 6,723,446 B2 | 4/2004 | Seta et al. | |
| 6,726,969 B1 | 4/2004 | Balaji et al. | |
| 6,727,970 B2 | 4/2004 | Grace et al. | |
| 6,730,253 B2 | 5/2004 | Etesse | |
| 6,733,609 B2 | 5/2004 | Leonarda van Heck | |
| 6,733,870 B2 | 5/2004 | Enlow et al. | |

| | | | | | | |
|---|---|---|---|---|---|---|
| 6,748,994 B2 | 6/2004 | Wien et al. | 7,638,203 B2 | 12/2009 | Inagaki et al. | |
| 6,755,012 B2 | 6/2004 | Frankefort | 7,700,189 B2 | 4/2010 | Amon et al. | |
| 6,762,124 B2 | 7/2004 | Kian et al. | 7,709,417 B2 | 5/2010 | Yukawa | |
| 6,765,070 B2 | 7/2004 | Tamura et al. | 7,727,620 B2 | 6/2010 | Yamada et al. | |
| 6,773,804 B2 | 8/2004 | Enlow et al. | 7,749,584 B2 | 7/2010 | Hayakawa et al. | |
| 6,774,036 B2 | 8/2004 | Goldstein | 7,846,517 B2 * | 12/2010 | McDaniel | 428/35.1 |
| 6,780,765 B2 | 8/2004 | Goldstein | 2001/0007395 A1 | 7/2001 | Gentile | |
| 6,786,376 B1 | 9/2004 | Pitzen et al. | 2001/0014492 A1 | 8/2001 | Noguchi et al. | |
| 6,787,208 B2 | 9/2004 | Galovic | 2001/0014729 A1 | 8/2001 | Hayakawa et al. | |
| 6,808,776 B2 | 10/2004 | Mientus et al. | 2001/0038920 A1 | 11/2001 | Hashimoto et al. | |
| 6,808,822 B2 | 10/2004 | Rajan et al. | 2001/0050287 A1 | 12/2001 | Namba et al. | |
| 6,821,592 B2 | 11/2004 | Rodick | 2001/0052385 A1 | 12/2001 | Enlow et al. | |
| 6,823,867 B2 | 11/2004 | Avery et al. | 2002/0006723 A1 | 1/2002 | Goldstein | |
| 6,824,001 B2 | 11/2004 | Johnson et al. | 2002/0007903 A1 | 1/2002 | Enlow et al. | |
| 6,824,839 B1 | 11/2004 | Popat et al. | 2002/0016381 A1 | 2/2002 | Kroll et al. | |
| 6,835,462 B2 | 12/2004 | Sun et al. | 2002/0025432 A1 | 2/2002 | Noguchi et al. | |
| 6,841,261 B2 | 1/2005 | Matsui et al. | 2002/0045055 A1 | 4/2002 | Ito et al. | |
| 6,844,391 B1 | 1/2005 | Iyer et al. | 2002/0056513 A1 | 5/2002 | Tabuchi | |
| 6,846,531 B2 | 1/2005 | Mientus et al. | 2002/0064611 A1 | 5/2002 | Kanai et al. | |
| 6,855,406 B2 | 2/2005 | Takayasu et al. | 2002/0074078 A1 | 6/2002 | Van Heck | |
| 6,856,086 B2 | 2/2005 | Grace et al. | 2002/0090502 A1 | 7/2002 | Ito et al. | |
| 6,867,983 B2 | 3/2005 | Liu et al. | 2002/0098303 A1 * | 7/2002 | Rackovan et al. | 428/34.9 |
| 6,872,462 B2 | 3/2005 | Roberts et al. | 2002/0098680 A1 | 7/2002 | Goldstein | |
| 6,875,485 B2 | 4/2005 | Kanai et al. | 2002/0119294 A1 | 8/2002 | Monkarsh et al. | |
| 6,890,400 B2 | 5/2005 | Scholz et al. | 2002/0124931 A1 | 9/2002 | Etesse | |
| 6,891,589 B2 | 5/2005 | Hata et al. | 2002/0136848 A1 | 9/2002 | Yoshii et al. | |
| 6,897,151 B2 | 5/2005 | Winter et al. | 2002/0150780 A1 | 10/2002 | Ito et al. | |
| 6,908,687 B2 | 6/2005 | Mendes et al. | 2002/0153345 A1 | 10/2002 | Johnson et al. | |
| 6,919,113 B2 | 7/2005 | Therrian et al. | 2002/0157772 A1 | 10/2002 | Enlow et al. | |
| 6,926,339 B2 | 8/2005 | Gentile | 2002/0168453 A1 | 11/2002 | McCutchan | |
| 6,926,959 B2 | 8/2005 | Kroll et al. | 2002/0186120 A1 | 12/2002 | Tamura et al. | |
| 6,932,135 B2 | 8/2005 | Tabuchi | 2002/0192412 A1 | 12/2002 | Satani et al. | |
| 6,940,408 B2 | 9/2005 | Ferguson et al. | 2002/0197499 A1 | 12/2002 | Hirose et al. | |
| 6,951,596 B2 | 10/2005 | Green et al. | 2003/0029544 A1 | 2/2003 | Noguchi et al. | |
| 6,989,418 B2 | 1/2006 | Ko et al. | 2003/0031866 A1 | 2/2003 | Noguchi et al. | |
| 6,991,828 B2 | 1/2006 | Husemann et al. | 2003/0039775 A1 | 2/2003 | Kong | |
| 7,014,920 B2 | 3/2006 | Kuiru | 2003/0054164 A1 | 3/2003 | Zimmermann et al. | |
| 7,019,067 B2 | 3/2006 | Holguin et al. | 2003/0054165 A1 | 3/2003 | Yamanaka et al. | |
| 7,051,493 B2 | 5/2006 | Cook et al. | 2003/0068453 A1 | 4/2003 | Kong | |
| 7,079,204 B2 | 7/2006 | Hata | 2003/0092267 A1 | 5/2003 | Kian et al. | |
| 7,093,362 B2 | 8/2006 | Dallmeyer et al. | 2003/0134062 A1 | 7/2003 | Rajan et al. | |
| 7,101,437 B2 | 9/2006 | Boutilier et al. | 2003/0143415 A1 | 7/2003 | Seta et al. | |
| 7,105,226 B2 | 9/2006 | Noguchi et al. | 2003/0147042 A1 | 8/2003 | Kawamoto et al. | |
| 7,130,007 B2 | 10/2006 | Hata et al. | 2003/0152792 A1 | 8/2003 | Takayasu et al. | |
| 7,138,703 B2 | 11/2006 | Maida et al. | 2003/0157354 A1 * | 8/2003 | Van Veghel et al. | 428/515 |
| 7,156,528 B2 | 1/2007 | Weiss et al. | 2003/0170427 A1 | 9/2003 | Ito et al. | |
| 7,156,944 B2 | 1/2007 | Moeller et al. | 2003/0192541 A1 | 10/2003 | Avery et al. | |
| 7,160,949 B2 | 1/2007 | Ota et al. | 2003/0199604 A1 | 10/2003 | Kroll et al. | |
| 7,165,888 B2 | 1/2007 | Rodick | 2003/0201007 A1 | 10/2003 | Fraas et al. | |
| 7,166,342 B2 | 1/2007 | Hayakawa et al. | 2003/0203166 A1 | 10/2003 | Droznek | |
| 7,168,815 B2 | 1/2007 | Shipman et al. | 2003/0218274 A1 | 11/2003 | Boutillier et al. | |
| 7,182,998 B2 | 2/2007 | Takagi et al. | 2004/0010257 A1 | 1/2004 | Cachia et al. | |
| 7,189,462 B2 | 3/2007 | Matsui et al. | 2004/0023488 A1 | 2/2004 | Goldstein | |
| 7,193,014 B2 | 3/2007 | Wilkey et al. | 2004/0028862 A1 | 2/2004 | Burwell et al. | |
| 7,195,822 B2 | 3/2007 | Hiruma | 2004/0038012 A1 | 2/2004 | Cook et al. | |
| 7,215,839 B2 | 5/2007 | Kawahara et al. | 2004/0039775 A1 | 2/2004 | Yoshida et al. | |
| 7,223,460 B2 | 5/2007 | Kwok et al. | 2004/0071962 A1 | 4/2004 | Tanimoto | |
| 7,232,857 B2 | 6/2007 | Hirasawa | 2004/0091625 A1 | 5/2004 | Winter et al. | |
| 7,236,222 B2 | 6/2007 | Yoda et al. | 2004/0119922 A1 | 6/2004 | Hata et al. | |
| 7,247,389 B2 | 7/2007 | Umeda | 2004/0124661 A1 | 7/2004 | Gentile | |
| 7,264,852 B2 | 9/2007 | Koishi et al. | 2004/0131806 A1 | 7/2004 | Barmore et al. | |
| 7,273,894 B2 | 9/2007 | Shelby et al. | 2004/0142195 A1 | 7/2004 | Roberts et al. | |
| 7,330,873 B2 | 2/2008 | Yoshida et al. | 2004/0175520 A1 | 9/2004 | Van Rijn et al. | |
| 7,344,765 B2 | 3/2008 | Hayakawa et al. | 2004/0180229 A1 | 9/2004 | Hayakawa et al. | |
| 7,351,767 B2 | 4/2008 | Hartsock et al. | 2004/0214142 A1 | 10/2004 | Sutula, Jr. | |
| 7,361,390 B2 | 4/2008 | Yoda et al. | 2004/0258938 A1 | 12/2004 | Yamanaka et al. | |
| 7,365,816 B2 | 4/2008 | Kawai et al. | 2004/0263731 A1 | 12/2004 | Hata et al. | |
| 7,368,153 B2 | 5/2008 | Barmore et al. | 2004/0265361 A1 | 12/2004 | Kuniya et al. | |
| 7,388,146 B2 | 6/2008 | Fraas et al. | 2005/0018328 A1 | 1/2005 | Hata et al. | |
| 7,422,779 B2 | 9/2008 | Van Rijn et al. | 2005/0019514 A1 | 1/2005 | Takegawa et al. | |
| 7,427,019 B2 | 9/2008 | Haertel | 2005/0031860 A1 | 2/2005 | Okada et al. | |
| D579,344 S | 10/2008 | Kunz | 2005/0095379 A1 | 5/2005 | Hayakawa et al. | |
| 7,435,456 B2 | 10/2008 | Nakamura | 2005/0106342 A1 | 5/2005 | Dawes et al. | |
| 7,473,473 B2 | 1/2009 | Verrocchi | 2005/0118406 A1 | 6/2005 | Shelby et al. | |
| 7,491,432 B2 | 2/2009 | Kachi et al. | 2005/0119359 A1 | 6/2005 | Shelby et al. | |
| 7,502,088 B2 | 3/2009 | Suzuki et al. | 2005/0151230 A1 | 7/2005 | Maida et al. | |
| 7,525,463 B2 | 4/2009 | Saunders et al. | 2005/0157389 A1 | 7/2005 | Shipman et al. | |
| 7,588,807 B2 | 9/2009 | Hayashi et al. | 2005/0157390 A1 | 7/2005 | Weiss et al. | |
| 7,625,612 B2 | 12/2009 | Ohmori et al. | 2005/0165164 A1 | 7/2005 | Moeller et al. | |

| | | |
|---|---|---|
| 2005/0187344 A1 | 8/2005 | Wilkey et al. |
| 2005/0191439 A1 | 9/2005 | Hirose et al. |
| 2005/0196563 A1 | 9/2005 | Ito et al. |
| 2005/0213320 A1 | 9/2005 | Kazuhiro et al. |
| 2005/0274687 A1 | 12/2005 | McCutchan |
| 2006/0019071 A1 | 1/2006 | Akita |
| 2006/0028601 A1 | 2/2006 | Kawahara et al. |
| 2006/0043169 A1 | 3/2006 | Haertel |
| 2006/0057323 A1 | 3/2006 | Yukawa et al. |
| 2006/0062934 A1 | 3/2006 | Hayashi et al. |
| 2006/0066787 A1 | 3/2006 | Yoda et al. |
| 2006/0071826 A1 | 4/2006 | Saunders et al. |
| 2006/0072057 A1 | 4/2006 | Yano et al. |
| 2006/0077320 A1 | 4/2006 | Hata et al. |
| 2006/0089457 A1 | 4/2006 | Hartsock et al. |
| 2006/0115667 A1 | 6/2006 | Verrocchi et al. |
| 2006/0121219 A1 | 6/2006 | Shelby et al. |
| 2006/0132688 A1 | 6/2006 | Yoda et al. |
| 2006/0159878 A1 | 7/2006 | Wakai et al. |
| 2006/0170848 A1 | 8/2006 | Kawai et al. |
| 2006/0177607 A1 | 8/2006 | Ohmori et al. |
| 2006/0186581 A1 | 8/2006 | Etesse et al. |
| 2006/0215079 A1 | 9/2006 | Suzuki et al. |
| 2006/0216435 A1 | 9/2006 | Nakamura |
| 2006/0222874 A1 | 10/2006 | Umeda |
| 2006/0233984 A1 | 10/2006 | Suzuki et al. |
| 2006/0246231 A1 | 11/2006 | Koishi et al. |
| 2006/0275592 A1 | 12/2006 | Tsuchida et al. |
| 2006/0292104 A1 | 12/2006 | Guskey et al. |
| 2007/0004813 A1 | 1/2007 | Shelby et al. |
| 2007/0043169 A1 | 2/2007 | Kwok et al. |
| 2007/0071967 A1 | 3/2007 | Inagaki et al. |
| 2001/0087191 | 4/2007 | Kaya et al. |
| 2007/0087191 A1 | 4/2007 | Kaya et al. |
| 2007/0099017 A1 | 5/2007 | Hayakawa et al. |
| 2007/0172669 A1 | 7/2007 | Amon et al. |
| 2007/0175574 A1 | 8/2007 | Crank |
| 2007/0212539 A1 | 9/2007 | Yamada et al. |
| 2007/0224345 A1 | 9/2007 | Metz et al. |
| 2007/0240806 A1 | 10/2007 | Suzuki et al. |
| 2008/0017605 A1 | 1/2008 | Zhang et al. |
| 2008/0026170 A1 | 1/2008 | Yamada et al. |
| 2008/0050651 A1 | 2/2008 | Wakai et al. |
| 2008/0057236 A1 | 3/2008 | Yamada et al. |
| 2008/0289986 A1 | 11/2008 | Goto et al. |
| 2008/0314909 A1 | 12/2008 | Takeo et al. |
| 2009/0022916 A1 | 1/2009 | Yamada et al. |
| 2009/0038736 A1 | 2/2009 | Lorence et al. |
| 2009/0042024 A1 | 2/2009 | Fujii et al. |
| 2009/0142456 A1 | 6/2009 | Segal et al. |
| 2009/0202757 A1 | 8/2009 | Fujio |
| 2009/0278187 A1 | 11/2009 | Toba |
| 2009/0313427 A1 | 12/2009 | Ukai et al. |

FOREIGN PATENT DOCUMENTS

| | | |
|---|---|---|
| DE | 2627312 | 12/1977 |
| DE | 8618893 | 12/1986 |
| DE | 8702448 | 4/1987 |
| DE | 3543317 | 6/1987 |
| DE | 19642110 | 4/1998 |
| DE | 10106383 | 8/2002 |
| DE | 102004004827 | 9/2005 |
| EP | 0050702 | 3/1981 |
| EP | 0060667 | 9/1982 |
| EP | 0121371 | 10/1984 |
| EP | 0187044 | 7/1986 |
| EP | 0208261 | 7/1986 |
| EP | 0189986 | 8/1986 |
| EP | 0210646 | 2/1987 |
| EP | 0313406 | 4/1989 |
| EP | 0317499 | 5/1989 |
| EP | 0319258 | 6/1989 |
| EP | 0326039 | 8/1989 |
| EP | 0340579 | 11/1989 |
| EP | 0342854 | 11/1989 |
| EP | 0395585 | 10/1990 |
| EP | 0400456 | 12/1990 |
| EP | 0261923 | 5/1991 |
| EP | 0445445 | 9/1991 |
| EP | 0448400 | 9/1991 |
| EP | 0454333 | 10/1991 |
| EP | 0456890 | 11/1991 |
| EP | 0460672 | 12/1991 |
| EP | 0477944 | 4/1992 |
| EP | 0482620 | 4/1992 |
| EP | 0510213 | 10/1992 |
| EP | 0588456 | 3/1994 |
| EP | 0220885 | 5/1994 |
| EP | 0478868 | 5/1994 |
| EP | 0621310 | 10/1994 |
| EP | 0628598 | 12/1994 |
| EP | 0663285 | 7/1995 |
| EP | 0664534 | 7/1995 |
| EP | 0667300 | 8/1995 |
| EP | 0486690 | 11/1995 |
| EP | 0688720 | 12/1995 |
| EP | 0570512 | 1/1996 |
| EP | 0698424 | 2/1996 |
| EP | 0575333 | 4/1996 |
| EP | 0730944 | 9/1996 |
| EP | 0733459 | 9/1996 |
| EP | 0582242 | 10/1996 |
| EP | 0616716 | 3/1997 |
| EP | 0779911 | 6/1997 |
| EP | 0805110 | 11/1997 |
| EP | 0578750 | 6/1998 |
| EP | 0852240 | 7/1998 |
| EP | 0812450 | 10/1998 |
| EP | 0884766 | 12/1998 |
| EP | 0930322 | 7/1999 |
| EP | 0930329 | 7/1999 |
| EP | 0785869 | 8/1999 |
| EP | 0959447 | 11/1999 |
| EP | 0963292 | 12/1999 |
| EP | 0979722 | 2/2000 |
| EP | 0983138 | 3/2000 |
| EP | 0989162 | 3/2000 |
| EP | 0999250 | 5/2000 |
| EP | 1019290 | 7/2000 |
| EP | 1024162 | 8/2000 |
| EP | 1043360 | 10/2000 |
| EP | 1055721 | 11/2000 |
| EP | 1072632 | 1/2001 |
| EP | 0675806 | 2/2001 |
| EP | 0858395 | 2/2001 |
| EP | 1074593 | 2/2001 |
| EP | 1083014 | 3/2001 |
| EP | 1083129 | 3/2001 |
| EP | 0891255 | 6/2001 |
| EP | 1107214 | 6/2001 |
| EP | 1116667 | 7/2001 |
| EP | 1120352 | 8/2001 |
| EP | 1122776 | 8/2001 |
| EP | 1124214 | 8/2001 |
| EP | 1145846 | 10/2001 |
| EP | 1151847 | 11/2001 |
| EP | 1157943 | 11/2001 |
| EP | 1160272 | 12/2001 |
| EP | 1172782 | 1/2002 |
| EP | 1176100 | 1/2002 |
| EP | 1184167 | 3/2002 |
| EP | 1201585 | 5/2002 |
| EP | 1205193 | 5/2002 |
| EP | 1205194 | 5/2002 |
| EP | 1205195 | 5/2002 |
| EP | 1227119 | 7/2002 |
| EP | 1234854 | 8/2002 |
| EP | 1238916 | 9/2002 |
| EP | 1262523 | 12/2002 |
| EP | 1270203 | 1/2003 |
| EP | 1270652 | 1/2003 |
| EP | 1270664 | 1/2003 |
| EP | 1275670 | 1/2003 |
| EP | 0772521 | 4/2003 |
| EP | 1299293 | 4/2003 |
| EP | 1304219 | 4/2003 |
| EP | 0932654 | 5/2003 |
| EP | 0831994 | 8/2003 |

| | | | | | |
|---|---|---|---|---|---|
| EP | 1333043 | 8/2003 | JP | 63-268743 | 11/1988 |
| EP | 1336641 | 8/2003 | JP | 63-272680 | 11/1988 |
| EP | 1340609 | 9/2003 | JP | 63272680 | 11/1988 |
| EP | 1361260 | 11/2003 | JP | 11-68426 | 7/1989 |
| EP | 1391294 | 2/2004 | JP | 2019230 | 1/1990 |
| EP | 1118885 | 3/2004 | JP | 4-041902 | 2/1992 |
| EP | 1398360 | 3/2004 | JP | 4-161324 | 6/1992 |
| EP | 1179563 | 5/2004 | JP | 5305664 | 11/1993 |
| EP | 1418042 | 5/2004 | JP | 6122152 | 5/1994 |
| EP | 1426165 | 6/2004 | JP | 62-91555 | 10/1994 |
| EP | 1431782 | 6/2004 | JP | 63-49702 | 12/1994 |
| EP | 1460101 | 9/2004 | JP | 7-165945 | 6/1995 |
| EP | 1464994 | 10/2004 | JP | 8-323859 | 12/1996 |
| EP | 1464995 | 10/2004 | JP | 9-239833 | 9/1997 |
| EP | 1489437 | 12/2004 | JP | 9-254257 | 9/1997 |
| EP | 1491219 | 12/2004 | JP | 9-272182 | 10/1997 |
| EP | 1491581 | 12/2004 | JP | 10-007168 | 1/1998 |
| EP | 1491585 | 12/2004 | JP | 10-020788 | 1/1998 |
| EP | 1505136 | 2/2005 | JP | 10-059412 | 3/1998 |
| EP | 1288249 | 3/2005 | JP | 10-095454 | 4/1998 |
| EP | 1420951 | 3/2005 | JP | 10-095470 | 4/1998 |
| EP | 1514680 | 3/2005 | JP | 10-194328 | 7/1998 |
| EP | 1538554 | 6/2005 | JP | 10-254364 | 9/1998 |
| EP | 1550690 | 7/2005 | JP | 10-209771 | 11/1998 |
| EP | 1566261 | 8/2005 | JP | 10-291252 | 11/1998 |
| EP | 1571639 | 9/2005 | JP | 10-305867 | 11/1998 |
| EP | 1616695 | 1/2006 | JP | 10-333577 | 12/1998 |
| EP | 1368442 | 2/2006 | JP | 10-337796 | 12/1998 |
| EP | 1632343 | 3/2006 | JP | 11-079210 | 3/1999 |
| EP | 1084815 | 4/2006 | JP | 11-115133 | 4/1999 |
| EP | 1646023 | 4/2006 | JP | 11-158241 | 6/1999 |
| EP | 1647847 | 4/2006 | JP | 11-208667 | 8/1999 |
| EP | 1525572 | 5/2006 | JP | 11-224049 | 8/1999 |
| EP | 1659425 | 5/2006 | JP | 11-272172 | 10/1999 |
| EP | 1661536 | 5/2006 | JP | 11-292135 | 10/1999 |
| EP | 1467857 | 6/2006 | JP | 11-338356 | 12/1999 |
| EP | 1684255 | 7/2006 | JP | 2000-025112 | 1/2000 |
| EP | 1688233 | 8/2006 | JP | 2000-029392 | 1/2000 |
| EP | 1695818 | 8/2006 | JP | 2000-043156 | 2/2000 |
| EP | 1698461 | 9/2006 | JP | 2000-047770 | 2/2000 |
| EP | 1712352 | 10/2006 | JP | 2000-053154 | 2/2000 |
| EP | 1714912 | 10/2006 | JP | 2000-056689 | 2/2000 |
| EP | 1723038 | 11/2006 | JP | 2000-057399 | 2/2000 |
| EP | 1724740 | 11/2006 | JP | 2000-142791 | 5/2000 |
| EP | 1733874 | 12/2006 | JP | 2000-177763 | 6/2000 |
| EP | 1737912 | 1/2007 | JP | 2000-212527 | 8/2000 |
| EP | 1747882 | 1/2007 | JP | 2000-229357 | 8/2000 |
| EP | 1752285 | 2/2007 | JP | 2000-305460 | 11/2000 |
| EP | 1862517 | 5/2007 | JP | 2000-305461 | 11/2000 |
| EP | 0854890 | 6/2007 | JP | 2000-313754 | 11/2000 |
| EP | 1810822 | 7/2007 | JP | 2000-326934 | 11/2000 |
| EP | 1839849 | 10/2007 | JP | 2000-335658 | 12/2000 |
| EP | 1862517 | 10/2007 | JP | 2000-343139 | 12/2000 |
| EP | 1876019 | 1/2008 | JP | 2001-002014 | 1/2001 |
| EP | 1915418 | 4/2008 | JP | 2001-004678 | 1/2001 |
| EP | 1537175 | 5/2008 | JP | 2001-010663 | 1/2001 |
| EP | 1692226 | 6/2009 | JP | 2001-019017 | 1/2001 |
| EP | 1692217 | 5/2010 | JP | 2001-051601 | 2/2001 |
| FR | 1187382 | 9/1959 | JP | 2001-082868 | 3/2001 |
| FR | 2164680 | 8/1973 | JP | 2001-088839 | 4/2001 |
| GB | 2023061 | 12/1979 | JP | 2001-125489 | 5/2001 |
| GB | 2142900 | 1/1985 | JP | 2001-145985 | 5/2001 |
| GB | 2204048 | 11/1988 | JP | 2001-154587 | 6/2001 |
| GB | 2310398 | 8/2007 | JP | 2001-158408 | 6/2001 |
| JP | 52115855 | 9/1977 | JP | 2001-171620 | 6/2001 |
| JP | 55044846 | 3/1980 | JP | 2001-175179 | 6/2001 |
| JP | 56078932 | 6/1981 | JP | 2001-180622 | 7/2001 |
| JP | 57025349 | 2/1982 | JP | 2001-196033 | 7/2001 |
| JP | 57034921 | 2/1982 | JP | 2001-206379 | 7/2001 |
| JP | 58005355 | 1/1983 | JP | 2001-206407 | 7/2001 |
| JP | 58118207 | 7/1983 | JP | 2001-215880 | 8/2001 |
| JP | 58185230 | 10/1983 | JP | 2001-219961 | 8/2001 |
| JP | 59-097175 | 6/1984 | JP | 2001-225855 | 8/2001 |
| JP | 59145114 | 8/1984 | JP | 2001-236019 | 8/2001 |
| JP | 60219030 | 11/1985 | JP | 2001-247652 | 9/2001 |
| JP | 62014687 | 1/1987 | JP | 2001-266806 | 9/2001 |
| JP | 62-286726 | 12/1987 | JP | 2001-271022 | 10/2001 |
| JP | 63122518 | 5/1988 | JP | 2001-272915 | 10/2001 |
| JP | 63-049702 | 10/1988 | JP | 2001-290425 | 10/2001 |

| | | | | | | |
|---|---|---|---|---|---|---|
| JP | 2001-294282 | 10/2001 | | JP | 2004-123213 | 4/2004 |
| JP | 2001-296805 | 10/2001 | | JP | 2004-147360 | 5/2004 |
| JP | 2001-315260 | 11/2001 | | JP | 2004-168350 | 6/2004 |
| JP | 2000-347571 | 12/2001 | | JP | 2004-170468 | 6/2004 |
| JP | 2001-341773 | 12/2001 | | JP | 2004-170469 | 6/2004 |
| JP | 2001-350411 | 12/2001 | | JP | 2004-170715 | 6/2004 |
| JP | 2002-001878 | 1/2002 | | JP | 2004-196918 | 7/2004 |
| JP | 2002-020705 | 1/2002 | | JP | 2004-256143 | 9/2004 |
| JP | 2002-032024 | 1/2002 | | JP | 2004-258115 | 9/2004 |
| JP | 2002-036356 | 2/2002 | | JP | 2004-302125 | 10/2004 |
| JP | 2002-046715 | 2/2002 | | JP | 2004-354743 | 12/2004 |
| JP | 2002-047358 | 2/2002 | | JP | 2005-001729 | 1/2005 |
| JP | 2002-059969 | 2/2002 | | JP | 2005-004017 | 1/2005 |
| JP | 2002-068150 | 3/2002 | | JP | 2005-015030 | 1/2005 |
| JP | 2002-072890 | 3/2002 | | JP | 2005-022089 | 1/2005 |
| JP | 2002-080074 | 3/2002 | | JP | 2005-029216 | 2/2005 |
| JP | 2002-087432 | 3/2002 | | JP | 2005-035238 | 2/2005 |
| JP | 2002-096863 | 4/2002 | | JP | 2005-041552 | 2/2005 |
| JP | 2002-120862 | 4/2002 | | JP | 2005-041891 | 2/2005 |
| JP | 2002-128133 | 5/2002 | | JP | 2005-070739 | 3/2005 |
| JP | 2002-132159 | 5/2002 | | JP | 2005-077677 | 3/2005 |
| JP | 2002-154506 | 5/2002 | | JP | 2005-082225 | 3/2005 |
| JP | 2002-193235 | 7/2002 | | JP | 2005-132453 | 5/2005 |
| JP | 2002-193321 | 7/2002 | | JP | 2005-139423 | 6/2005 |
| JP | 2002-196677 | 7/2002 | | JP | 2005-148331 | 6/2005 |
| JP | 2002-203525 | 7/2002 | | JP | 2005-162262 | 6/2005 |
| JP | 2002-205712 | 7/2002 | | JP | 2005-173611 | 6/2005 |
| JP | 2002-205713 | 7/2002 | | JP | 2005-183093 | 7/2005 |
| JP | 2002-215044 | 7/2002 | | JP | 2005-186991 | 7/2005 |
| JP | 2002-253894 | 9/2002 | | JP | 2005-193984 | 7/2005 |
| JP | 2002-208228 | 10/2002 | | JP | 2005-196151 | 7/2005 |
| JP | 2002-284173 | 10/2002 | | JP | 2005-212226 | 8/2005 |
| JP | 2002-294392 | 10/2002 | | JP | 2005-219767 | 8/2005 |
| JP | 2002-308228 | 10/2002 | | JP | 2005-221982 | 8/2005 |
| JP | 2002-308240 | 10/2002 | | JP | 2005-239246 | 9/2005 |
| JP | 2002-316360 | 10/2002 | | JP | 2005-239948 | 9/2005 |
| JP | 2002-326613 | 11/2002 | | JP | 2005-266592 | 9/2005 |
| JP | 2002-332016 | 11/2002 | | JP | 2005-280727 | 10/2005 |
| JP | 2002-337880 | 11/2002 | | JP | 2005-280782 | 10/2005 |
| JP | 2002-337941 | 11/2002 | | JP | 2005-280789 | 10/2005 |
| JP | 2002-351333 | 12/2002 | | JP | 2000-318105 | 11/2005 |
| JP | 2002-361741 | 12/2002 | | JP | 2005-313944 | 11/2005 |
| JP | 2003-020013 | 1/2003 | | JP | 2005-335764 | 12/2005 |
| JP | 2003-020014 | 1/2003 | | JP | 2005-338304 | 12/2005 |
| JP | 2003-026127 | 1/2003 | | JP | 2006-001573 | 1/2006 |
| JP | 2003-029638 | 1/2003 | | JP | 2006-044797 | 2/2006 |
| JP | 2003-034369 | 2/2003 | | JP | 2006-047499 | 2/2006 |
| JP | 2003-040219 | 2/2003 | | JP | 2006-056552 | 3/2006 |
| JP | 2003-043922 | 2/2003 | | JP | 2006-063139 | 3/2006 |
| JP | 2003-049131 | 2/2003 | | JP | 2006-116874 | 5/2006 |
| JP | 2003-054520 | 2/2003 | | JP | 2006-151479 | 6/2006 |
| JP | 2003-054561 | 2/2003 | | JP | 2006-156755 | 6/2006 |
| JP | 2003-058057 | 2/2003 | | JP | 2006-159901 | 6/2006 |
| JP | 2003-063536 | 3/2003 | | JP | 2006-160796 | 6/2006 |
| JP | 2003-095225 | 4/2003 | | JP | 2006-168753 | 6/2006 |
| JP | 2003-104330 | 4/2003 | | JP | 2006-169285 | 6/2006 |
| JP | 2003-128021 | 5/2003 | | JP | 2006-193215 | 7/2006 |
| JP | 2003-165512 | 6/2003 | | JP | 2006-201534 | 8/2006 |
| JP | 2003-166133 | 6/2003 | | JP | 2006-213341 | 8/2006 |
| JP | 2003-175964 | 6/2003 | | JP | 2006-215245 | 8/2006 |
| JP | 2003-200528 | 7/2003 | | JP | 2006-225009 | 8/2006 |
| JP | 2003-200529 | 7/2003 | | JP | 2006-240697 | 9/2006 |
| JP | 2003-205946 | 7/2003 | | JP | 2006-240721 | 9/2006 |
| JP | 2003-252384 | 9/2003 | | JP | 2006-248539 | 9/2006 |
| JP | 2003-255839 | 9/2003 | | JP | 2006-256665 | 9/2006 |
| JP | 2003-261171 | 9/2003 | | JP | 2006-281584 | 10/2006 |
| JP | 2003-267437 | 9/2003 | | JP | 2006-282246 | 10/2006 |
| JP | 2003-271062 | 9/2003 | | JP | 2006-337635 | 12/2006 |
| JP | 2003-280528 | 10/2003 | | JP | 2006-349749 | 12/2006 |
| JP | 2003-292029 | 10/2003 | | JP | 2007-025174 | 2/2007 |
| JP | 2003-300516 | 10/2003 | | JP | 2007-112719 | 5/2007 |
| JP | 2003-305771 | 10/2003 | | JP | 2007-156928 | 6/2007 |
| JP | 2003-312723 | 11/2003 | | JP | 2007-156930 | 6/2007 |
| JP | 2003-321055 | 11/2003 | | JP | 2007-160543 | 6/2007 |
| JP | 2003-335343 | 11/2003 | | JP | 2007-160544 | 6/2007 |
| JP | 2004-067117 | 3/2004 | | JP | 2007-191606 | 8/2007 |
| JP | 2004-067189 | 3/2004 | | JP | 2007-242248 | 9/2007 |
| JP | 2004-106848 | 4/2004 | | JP | 2007-291342 | 11/2007 |
| JP | 2004-122385 | 4/2004 | | JP | 2007-311527 | 11/2007 |

| | | |
|---|---|---|
| JP | 2007-334086 | 12/2007 |
| JP | 2008-022250 | 1/2008 |
| JP | 2008-106252 | 5/2008 |
| JP | 2009-058687 | 3/2009 |
| JP | 2009-058722 | 3/2009 |
| JP | 2009-066966 | 4/2009 |
| JP | 2009-114380 | 5/2009 |
| JP | 2009-272564 | 11/2009 |
| JP | 2009-301393 | 12/2009 |
| WO | WO 90/05672 | 5/1990 |
| WO | WO9208611 | 5/1992 |
| WO | WO 92/11997 | 7/1992 |
| WO | WO 92/13923 | 8/1992 |
| WO | WO 92/17306 | 10/1992 |
| WO | WO93/01251 | 1/1993 |
| WO | WO 94/14611 | 7/1994 |
| WO | WO 95/15461 | 6/1995 |
| WO | WO 95/21775 | 8/1995 |
| WO | WO 96/02386 | 2/1996 |
| WO | WO 96/07699 | 3/1996 |
| WO | WO 96/10274 | 4/1996 |
| WO | WO 96/11804 | 4/1996 |
| WO | WO 96/27178 | 9/1996 |
| WO | WO 96/33864 | 10/1996 |
| WO | WO 96/42115 | 12/1996 |
| WO | WO 97/07490 | 2/1997 |
| WO | WO 97/11115 | 3/1997 |
| WO | WO97/13645 | 4/1997 |
| WO | WO 97/13645 | 4/1997 |
| WO | WO 97/14558 | 4/1997 |
| WO | WO 97/29523 | 8/1997 |
| WO | WO 97/31076 | 8/1997 |
| WO | WO 97/35719 | 10/1997 |
| WO | WO 98/14825 | 4/1998 |
| WO | WO 98/32786 | 7/1998 |
| WO | WO 98/52742 | 11/1998 |
| WO | WO 98/56662 | 12/1998 |
| WO | WO 99/15599 | 4/1999 |
| WO | WO 99/29490 | 6/1999 |
| WO | WO99/52788 | 10/1999 |
| WO | WO99/67768 | 12/1999 |
| WO | WO 00/04396 | 1/2000 |
| WO | WO 00/29469 | 5/2000 |
| WO | WO00/61371 | 10/2000 |
| WO | WO 01/19598 | 3/2001 |
| WO | WO 01/19692 | 3/2001 |
| WO | WO 01/38434 | 5/2001 |
| WO | WO 01/55276 | 8/2001 |
| WO | WO 01/64435 | 9/2001 |
| WO | WO 01/83612 | 11/2001 |
| WO | WO 01/87751 | 11/2001 |
| WO | WO 01/90227 | 11/2001 |
| WO | WO 02/06133 | 1/2002 |
| WO | WO0207631 | 1/2002 |
| WO | WO 02/38192 | 5/2002 |
| WO | WO 02/38193 | 5/2002 |
| WO | WO 02/38194 | 5/2002 |
| WO | WO 02/38641 | 5/2002 |
| WO | WO 02/066569 | 8/2002 |
| WO | WO 02/072441 | 9/2002 |
| WO | WO 03/006229 | 1/2003 |
| WO | WO 03/016026 | 2/2003 |
| WO | WO 03/016053 | 2/2003 |
| WO | WO 03/039775 | 2/2003 |
| WO | WO 03/029002 | 4/2003 |
| WO | WO 03/033262 | 4/2003 |
| WO | WO 03/055937 | 7/2003 |
| WO | WO 03/061957 | 7/2003 |
| WO | WO 03/073401 | 9/2003 |
| WO | WO 03/078152 | 9/2003 |
| WO | WO0047396 | 1/2004 |
| WO | WO 2004/012938 | 2/2004 |
| WO | WO 2004/013831 | 2/2004 |
| WO | WO 2004/014635 | 2/2004 |
| WO | WO 2004/018198 | 3/2004 |
| WO | WO 2004/018204 | 3/2004 |
| WO | WO 2004/022646 | 3/2004 |
| WO | WO 2004/033541 | 4/2004 |
| WO | WO 2004/071962 | 4/2004 |
| WO | WO 2004/052644 | 6/2004 |
| WO | WO 2004/094139 | 11/2004 |
| WO | WO 2004/110750 | 12/2004 |
| WO | WO 2004/112684 | 12/2004 |
| WO | WO 2005/045385 | 5/2005 |
| WO | WO 2005/048218 | 5/2005 |
| WO | WO 2005/056292 | 6/2005 |
| WO | WO 2005/061595 | 7/2005 |
| WO | WO 2005/061596 | 7/2005 |
| WO | WO 2005/061628 | 7/2005 |
| WO | WO 2005/063485 | 7/2005 |
| WO | WO 2005/068521 | 7/2005 |
| WO | WO 2005/073468 | 8/2005 |
| WO | WO 2005/075296 | 8/2005 |
| WO | WO 2005/086122 | 8/2005 |
| WO | WO 2005/083000 | 9/2005 |
| WO | WO 2005/085381 | 9/2005 |
| WO | WO 2005/092721 | 10/2005 |
| WO | WO 2005/095106 | 10/2005 |
| WO | WO 2005/095381 | 10/2005 |
| WO | WO 2005/100498 | 10/2005 |
| WO | WO 2005/110746 | 11/2005 |
| WO | WO 2005/113699 | 12/2005 |
| WO | WO 2005/123525 | 12/2005 |
| WO | WO2005118288 | 12/2005 |
| WO | WO 2006/004094 | 2/2006 |
| WO | WO 2006/013967 | 2/2006 |
| WO | WO 2006/015884 | 2/2006 |
| WO | WO 2006/047655 | 5/2006 |
| WO | WO 2006/051628 | 5/2006 |
| WO | WO 2006/051884 | 5/2006 |
| WO | WO 2006/051920 | 5/2006 |
| WO | WO2006047665 | 5/2006 |
| WO | WO 2006/060766 | 6/2006 |
| WO | WO 2006/062742 | 6/2006 |
| WO | WO 2006/070933 | 7/2006 |
| WO | WO 2006/075634 | 7/2006 |
| WO | WO 2006/077845 | 7/2006 |
| WO | WO 2006/084214 | 8/2006 |
| WO | WO 2006/095730 | 9/2006 |
| WO | WO 2006/109662 | 10/2006 |
| WO | WO 2006/113488 | 10/2006 |
| WO | WO 2006/121118 | 11/2006 |
| WO | WO 2006/134647 | 12/2006 |
| WO | WO 2007/015244 | 2/2007 |
| WO | WO 2007/054661 | 5/2007 |
| WO | WO 2007/069615 | 6/2007 |
| WO | WO 2008/044221 | 4/2008 |
| WO | WO2009/124228 | 1/2009 |

OTHER PUBLICATIONS

Reply to Written Opinion of International Preliminary Examining Authority—PCT/US2008/059397—May 8, 2009.
International Preliminary Report on Patentability—PCT/US2008/059397—Jun. 2, 2009.
International Search Report & Written Opinion—PCT/US2009/039398—Feb. 7, 2009.
International Preliminary Report on Patentability—PCT/US2009/039398—Oct. 6, 2010.
International Search Report & Written Opinion—PCT/US2009/039392—Feb. 7, 2009.
International Preliminary Report on Patentability—PCT/US2009/039392—Oct. 4, 2010.
International Search Report—PCT/US2010/043343—Feb. 10, 2011.
International Preliminary Report on Patentability Chapter I—PCT/US2010/043343—Jan. 31, 2012.
Written Opinion of the International Search Authority—PCT/US2010/043343—Jan. 27, 2012.
International Search Report—PCT/US2011/021968—Nov. 17, 2011.
International Search Report—PCT/US2010/061272—Aug. 4, 2011.
International Search Report dated Aug. 18, 2008 for Application No. PCT/US2008/059397 filed Apr. 4, 2008.
Written Opinion dated May 10, 2009 for Application No. PCT/US2008/059397 filed Apr. 4, 2008.

* cited by examiner

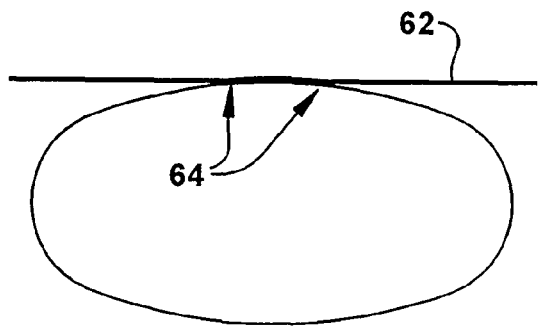
Fig. 6B
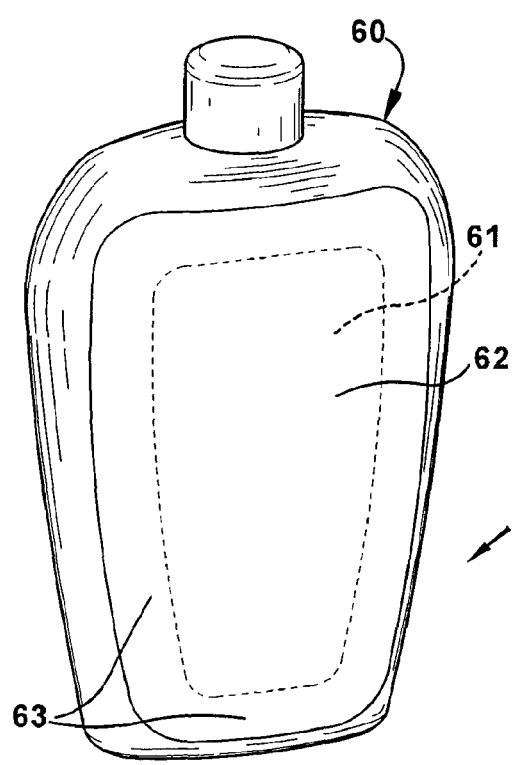
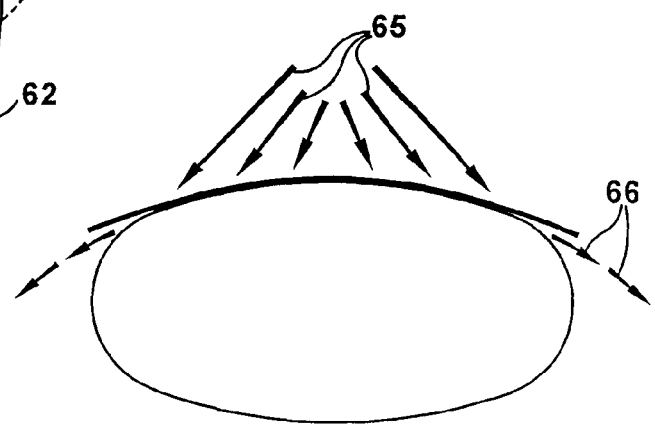
Fig. 6C
Fig. 6A
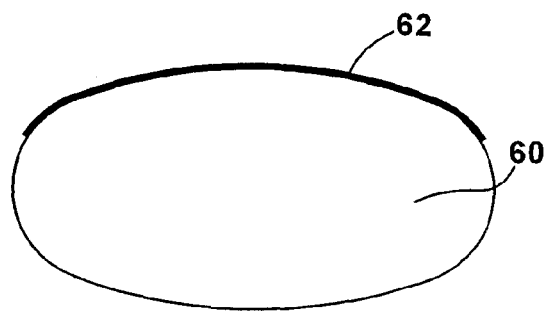
Fig. 6D

PRESSURE SENSITIVE SHRINK LABEL

CROSS REFERENCE TO RELATED APPLICATIONS

This application is a continuation-in-part of PCT/US08/59397 filed Apr. 4, 2008, which claims priority from provisional applications U.S. Ser. No. 60/910,282 filed Apr. 5, 2007 and U.S. Ser. No. 60/938,019 filed May 15, 2007, the entire disclosures of which are incorporated herein by reference, and is related to co-pending U.S. application Ser. No. 12/237,761 filed on Sep. 25, 2008.

TECHNICAL FIELD

This invention relates to pressure sensitive shrink labels. More specifically, the invention relates to pressure sensitive labels that have superior conformability to containers having complex shapes and methods for applying such labels.

BACKGROUND

It is common practice to apply labels to containers or bottles to provide information such as the supplier of the container or the contents of the container. Such containers and bottles are available in a wide variety of shapes and sizes for holding many different types of materials such as detergents, chemicals, personal care products, motor oil, beverages, etc.

Polymeric film materials and film facestocks have been described for use as labels in various fields. Polymeric labels are increasingly desired for many applications, particularly clear polymeric labels since they provide a no-label look to decorated glass and plastic containers. Paper labels block the visibility of the container and/or the contents in the container. Clear polymeric labels enhance the visual aesthetics of the container, and therefore the product, and are growing much faster than paper labels in the package decoration market as consumer product companies are continuously trying to upgrade the appearance of their products. Polymeric film labels also have superior mechanical properties, such as tensile strength and abrasion resistance.

Traditional pressure sensitive adhesive (PSA) labels often have difficulty adhering smoothly to containers having curved surfaces and/or complex shapes without wrinkling, darting or lifting on the curved surfaces. The label size of typical PSA labels is limited to no larger than ¼ inch (6.35 mm) away from the edge (beginning) of curvature of a container or article. Shrink sleeve labels have typically been used on these types of compound containers. Labeling operations are carried out using processes and methods that require the formation of a tube or sleeve of the heat shrink film that is placed over the container and heated in order to shrink the film to conform to the size and shape of the container. Alternatively, the containers are completely wrapped with a shrink label using a process wherein the shrink film is applied to the container directly from a continuous roll of film material and then heat is applied to conform the wrapped label to the container. However, label defects can occur during labeling operations of simple or compound shaped bottles during application or in post application processes. These misapplied labels result in high scrap or extra processing steps that can be costly.

The present invention provides a pressure sensitive adhesive label that can be applied to containers and articles on complex shapes and compound curves with less material required and less cost than for shrink sleeve or shrink wrap labels. In addition, the labels of the present invention enable the user to expand the billboard or graphics region of traditional pressure sensitive labels on containers and articles having complex shapes and/or compound curves.

SUMMARY

A label for application on a curved or nonplanar surface comprising a heat shrink film and a pressure sensitive adhesive is provided. In one embodiment, there is provided a pressure sensitive adhesive label for application on a surface having at least one compound curve, the label comprising: a heat shrinkable film having an inner surface and outer surface, and a machine direction and a transverse direction, the film having an ultimate shrinkage S in at least one direction of at least 10% at 90° C., wherein the shrinkage in the other direction is S±20%; and a layer of pressure sensitive adhesive on the inner surface of the heat shrinkable film. The shrink film has moderate and balanced shrink in both the machine direction and the transverse direction. In one embodiment, the film has an ultimate shrinkage S in at least one direction of at least 10% at 90° C., and the shrinkage in the other direction is S±10%. The label may further include a release liner removal adhered to the adhesive layer.

There is also provided an article bearing a label comprising: an article having a surface comprising at least one compound curve; and a pressure sensitive label comprising a heat shrinkable film having an inner surface and outer surface, and a layer of pressure sensitive adhesive on the inner surface of the heat shrinkable film, wherein the label is applied to at least one compound curve.

A method of applying a label to an article wherein the article has a surface having at least one compound curve is provided. The method comprises: (a) providing an article having a surface comprising at least one compound curve; (b) providing a label comprising (i) a heat shrinkable film having an inner surface and outer surface and (ii) a layer of pressure sensitive adhesive on the inner surface of the heat shrinkable film, wherein the label has a central portion and a peripheral portion; (c) contacting the adhesive layer of the central portion of the label with the article; (d) applying pressure to the label in an outward direction from the central portion to the peripheral portion, wherein at least a portion of the label is applied to at least one compound curve of the article; and (e) applying heat to at least a portion of the label to shrink at least that portion of the label and adhere the label to the article. After or during the application of heat, the label may be further compressed or wiped down to fully adhere the label to the article and eliminate any remaining defects in the label.

In one aspect of the invention, there is provided a method of applying a label to an article, the method including the steps of: providing an article having a surface including at least one compound curve; providing a label including (i) a heat shrinkable film having an inner surface and an outer surface; and (ii) a layer of pressure sensitive adhesive on the inner surface of the heat shrinkable film, wherein the label has a first edge and a contact region; contacting the adhesive layer in the contact region with the article; applying heat and pressure simultaneously to the label in a direction from the contact region to the first edge such that the first edge of the label adheres to article and the label shrinks to conform to the compound curve of the article, wherein the heat and pressure are applied by a heated conformable membrane.

The heated and pressure is applied to the label, in one embodiment, by a walking beam that includes a conformable heated bladder. The heated bladder may be expandable.

In another embodiment, heat and pressure are applied by a walking beam that includes a heated cavity wherein the shape of the cavity corresponds to the shape of the article to which the label is applied.

In one embodiment, heat and pressure are applied by a walking beam that includes a flexible heated membrane suspended between at least two frame members. The heated membrane may be porous or non-porous. The porous membrane may include a mesh screen.

In yet another embodiment, heat and pressure are applied by a walking beam that includes a flexible heated membrane mounted to a rectangular frame. The walking beam may alternatively include a flexible heated membrane mounted to a frame having a shape corresponding to the shape of the article to which the label is applied.

BRIEF DESCRIPTION OF DRAWINGS

FIGS. 6A-6D schematically illustrate the process of applying the label to an article having a compound curve.

DETAILED DESCRIPTION

Figure 1:
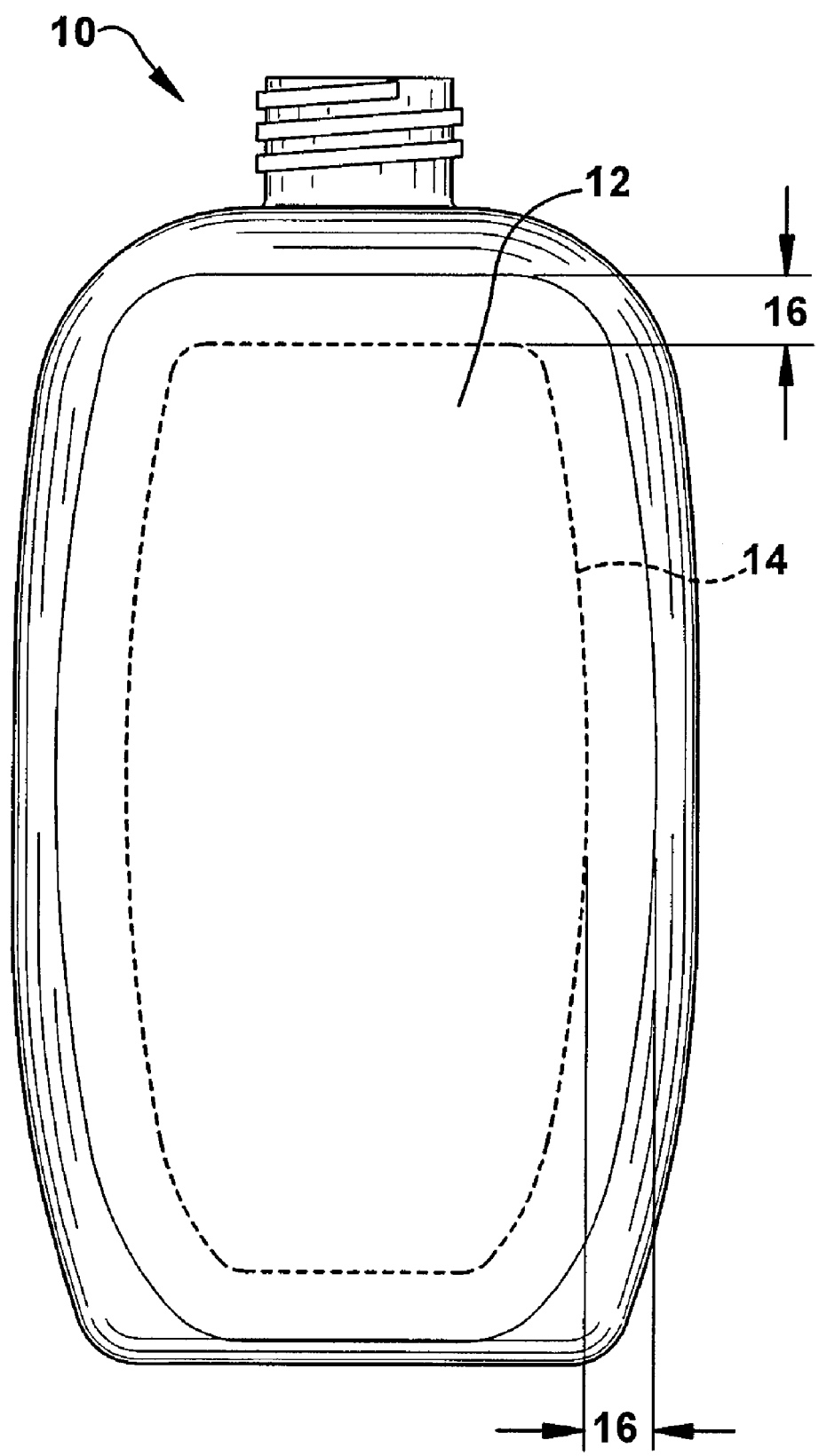
FIG. 1 illustrates a front view of a container to which the label of the present invention has been applied as compared to prior art pressure sensitive labels.

Pressure sensitive adhesive labels are provided that can improve the appearance of labeled containers and articles by conforming to the contours of the container or article and by providing an enlarged billboard appearance. End users and product designers must currently alter their designs to accommodate the limitations of traditional product decorating technologies. The labels of the present invention provide the designers with more freedom in product designs to create more shelf appeal and to carry more information.

Containers and articles with compound curves typically have to be fully wrapped with shrink film in order to label or decorate the article. The labels of the present invention are capable of expanding the label over complex curves without having to fully wrap the article. This partial label coverage impacts the product cost as well as the product appearance. Typical pressure sensitive labels cannot be applied to containers and articles without undesirable darting and wrinkling of the label. "Darting" is defined as the accumulation of excess label material that rises up away from the article to which the label is applied.

The labels of the present invention provide significant processing advantages over traditional shrink labels. For example, the pressure sensitive shrink labels of the present invention allow for more traditional printing and secondary processes such as foils and hot stamping. Where typical shrink labels must be subsurface printed, the labels of the present invention can be surface printed, which enhances the color quality, sharpness and texture of the printed image. The label film may be printed by water flexographic, UV flexographic, UV letterpress, UV screen, solvent gravure and hot foil stamp.

The pressure sensitive labels comprise (a) a heat shrinkable polymeric film having an inner surface and an outer surface and a machine direction and a transverse direction; and (b) a layer of pressure sensitive adhesive on the inner surface of the heat shrinkable film. The shrinkage of the heat shrinkable polymeric film is balanced in the machine direction and the transverse direction. In at least one direction, the ultimate shrinkage (S) is at least 10% at 90° C. and in the other direction, the shrinkage is S±20%. As an illustration of balanced shrinkage, if the shrinkage in the machine direction is 40% at 105° C., then the shrinkage in the transverse direction is 40%±20%, or within the range of 20% to 60% at 105° C. In one embodiment, the ultimate shrinkage (S) is at least 10% at 90° C. and in the other direction, the shrinkage is S±10%. As used herein, the term "ultimate shrinkage" means the maximum shrinkage the film is capable of achieving at a particular shrink temperature, as measured by ASTM Method D 1204.

The labels are not provided as a shrink sleeve or tube that encapsulates the entire article or as a shrink wrap label that wraps around the article and forms a seam wherein the ends of the label meet. The present labels may be provided in a variety of shapes to suit the article or container to which they are applied, giving the container designer greater latitude in container configuration and label design than with traditional pressure sensitive labels or with shrink wrap or shrink sleeve labels. The labels may be cut into the desired shape by any known method, including, for example, die cutting and laser cutting. In one embodiment, the label is die cut to a specific configuration that compensates for the shrinkage of the label and the shape of the article to which it is applied.

Because the label is conformable, the billboard or graphics area of the labeled container can be extended further onto the container edges and onto compound curved areas of the container. The label may be 10% to 30% larger than a standard PSA label. As used herein, the term "compound curve" means a surface having no direction for which there is no curvature. For example, the surface of a sphere or the surface of an ellipsoid has curvature in every direction, and therefore has compound curves. A cylinder, on the other hand, has a surface for which there is at least one direction for which there is no curvature. Thus, a simple cylinder does not have compound curves.

FIG. 1 illustrates the expanded billboard area of the pressure sensitive shrink label of the present invention. Bottle 10 has pressure sensitive shrink label 12 adhered thereto. The dashed line 14 indicates the outer boundary of standard pressure sensitive labels. A standard (i.e., non-shrink) pressure sensitive label cannot extend onto the areas of the bottle having the compound curves 16 (the area between the inner dashed line and the outer solid line). When label 12 is initially applied to the bottle 10, darts and pleats may form near the perimeter of the label in the areas of the bottle having compound curves 16.

Once the pressure sensitive label is applied to the container, heat is applied as needed to eliminate any label application defects such as darts, edge lift and wrinkles. In one embodiment, pressure and/or wipe down may be used in addition to the application of heat to eliminate any defects.

Figure 2A:
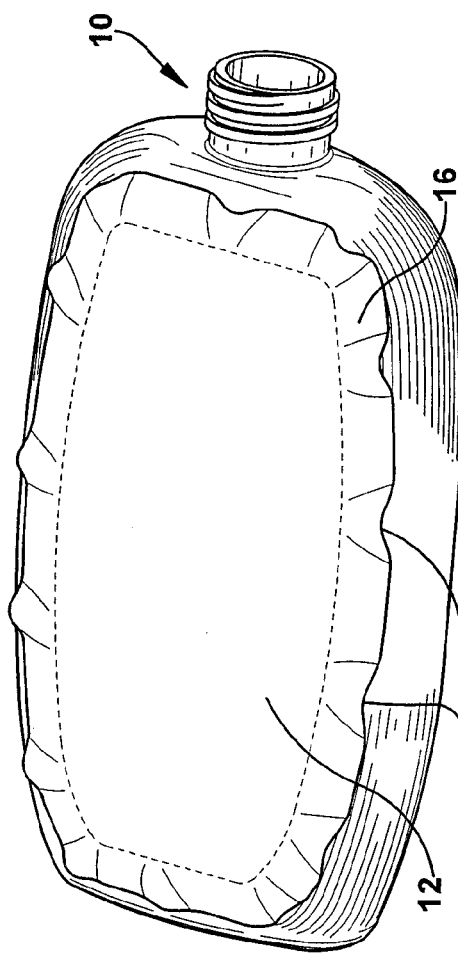
FIG. 2A to 2D illustrates the labeled container before and after the application of heat to the label.
Figure 2B:
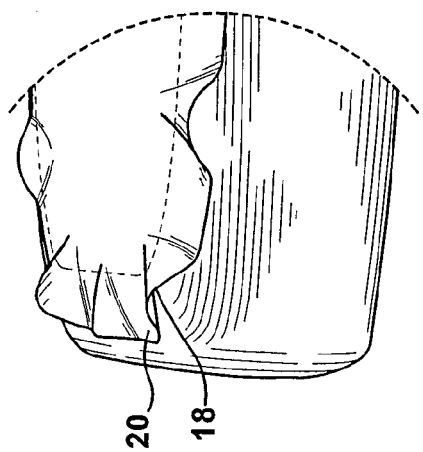
Figure 2C:
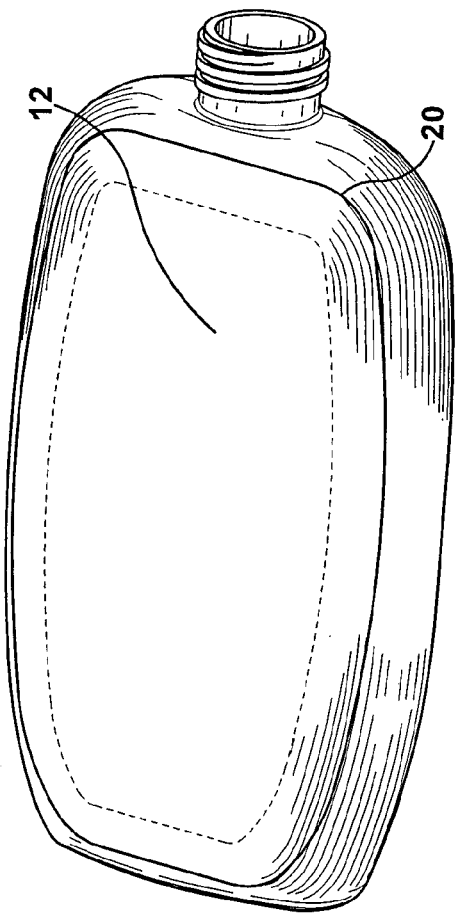
Figure 2D:
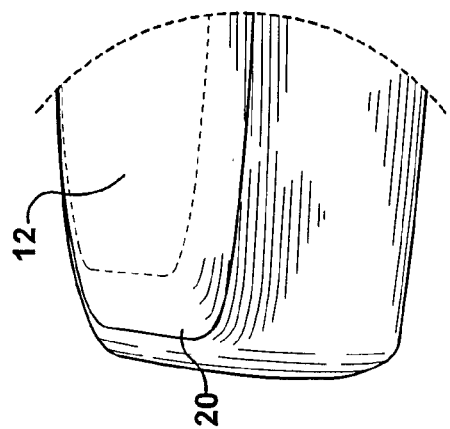

Referring to FIGS. 2A-2D, the present label and method for applying the label are illustrated. In FIGS. 2A and 2B, a label 12 that includes a shrink film having a continuous layer of pressure sensitive adhesive applied thereto is applied to a container 10 having compound curves around the circumference of the container, and then wiped down. No heat is applied to the label. The label 12 extends onto the compound curves 16 where darts 18 are formed near the perimeter 20 of the label. FIGS. 2C and 2D show the labeled container of FIGS. 2A-2B after heat is applied to the label. The darts 18 have been eliminated and the label 12 conforms to the compound curves of the container 10 near the label perimeter 20 without any defects.

The article or container to which the label is applied can be provided in a variety of forms or shapes. Non-limiting examples of suitable articles include containers with and without closures, trays, lids, toys, appliances, etc. The article or container may be made of any conventional polymer, glass, or metal such as aluminum. Examples of suitable polymeric materials include high density polyethylene (HDPE), low density polyethylene (LDPE), polyethylene terephthalate (PET), polypropylene (PP), polyvinyl chloride, polycarbonate, nylon, fluorinated ethylene propylene, polystyrene, etc. The article or container can be made by a number of various processes known in the art, such as blow molding, injection molding, thermoforming, rotational molding and the like.

Useful containers include, for example, a bottle having a closure on the top of the bottle, an upside down bottle having a closure on the bottom of the bottle, a bottle with a pump dispenser or a foaming dispenser, a tube with a closure and a bottle with a closure.

The container or article may have a transparent appearance. In one embodiment, the container or article has a translucent appearance. The translucent appearance can be achieved by, for example, treatments of the transparent container or article, the addition of ingredients such as dyes and pearlescent agents to base polymers, the use of polypropylene and/or polyethylene that are mixed with clarifying agents. The treatments include, for example, spray coating, sandblasting, and mold surface treatment.

The container or article may include aesthetic features, including, for example, textures, embossing, lenticular lens, colors, holograms, frosted or matte color, etc. The surface of the container or article may be treated prior to application of the label. For example, the surface of the container or article may be flame treated or a primer coating may be applied.

Figure 3A:
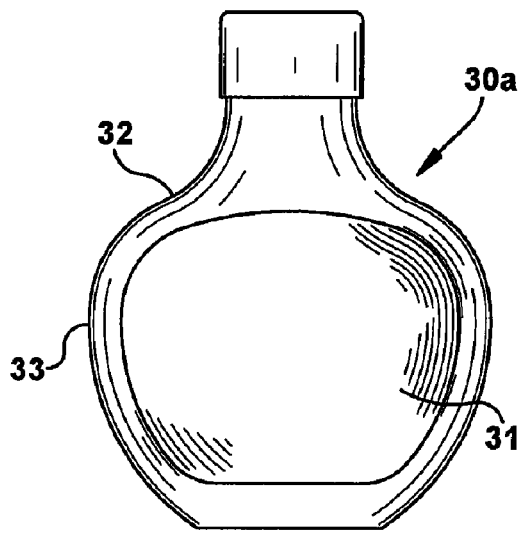
FIG. 3A to 3D illustrate embodiments of containers having complex shapes and compound curves to which the label of the present invention is applied.
Figure 3B:
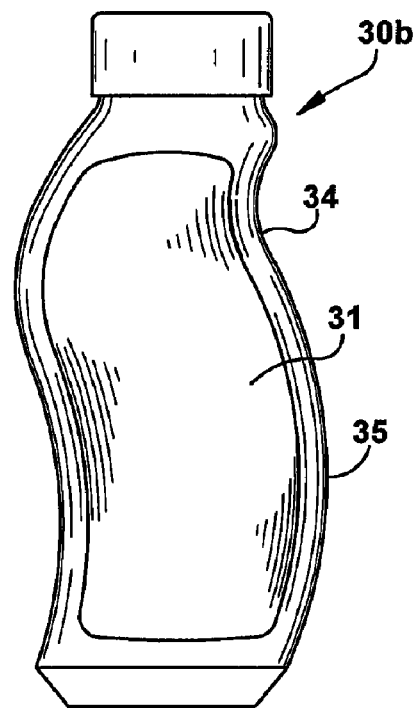
Figure 3C:
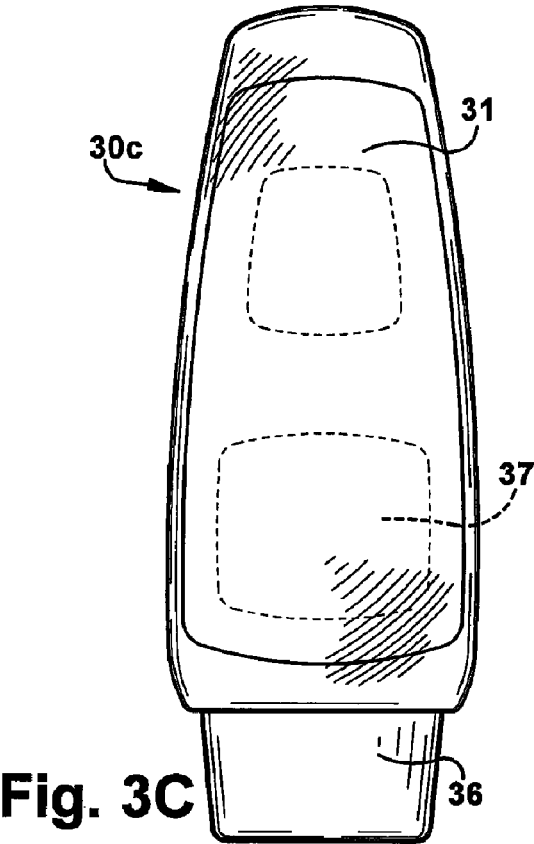
Figure 3D:
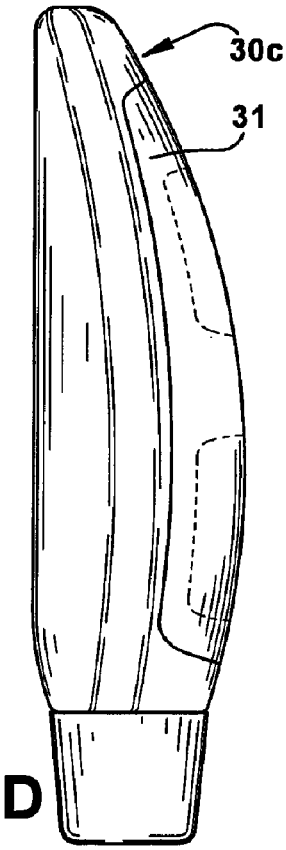

FIGS. 3A, 3B and 3C each illustrate a container having a complex shape and compound curves. FIG. 3A is a front view of a container 30a having a symmetrical, spherical shape wherein the container has a tapered concave area 32 at the top and a wider convex area 33 toward the bottom. Typically, a shrink sleeve would be used to provide a functional label for this container. With the present invention, a pressure sensitive shrink label 31 can be smoothly applied to container 30a without the appearance of label defects. FIG. 3B is a front view of a container 30b having an asymmetrical shape wherein one side of the container has both a concave area 34 and a convex area 35 and the opposing side curves in a substantially similar manner along the length of the container. The conventional method of labeling container 30b would be to apply a shrink sleeve label to conform to the complex shape of the container. A pressure sensitive shrink label 31 can be applied to the container 30b to provide sufficient billboard area with much less label material. FIG. 3C is a front view of a container 30c that is an upside down bottle having a closure 36 at the bottom and label 31 applied to the front surface. FIG. 3D is a side view of container 30c. The areas 37 within the dashed lines indicate the outer boundaries of standard pressure sensitive labels that can be applied to the container. The complex shape of this container requires two separate standard pressure sensitive labels to decorate the container, as the application of one continuous standard pressure sensitive label would result in the formation of darts and pleat defects. Pressure sensitive shrink label 31 can cover a much larger area, which provides more design options for the product designer.

Figure 4A:
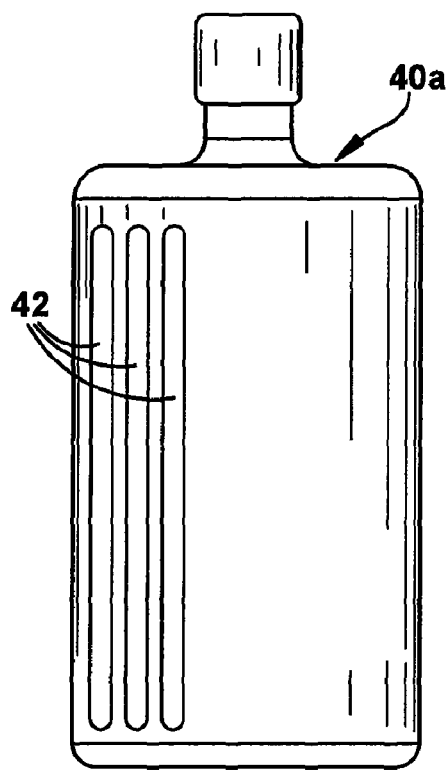
FIGS. 4A and 4B illustrate front views of embodiments of containers having irregular surfaces.
Figure 4B:
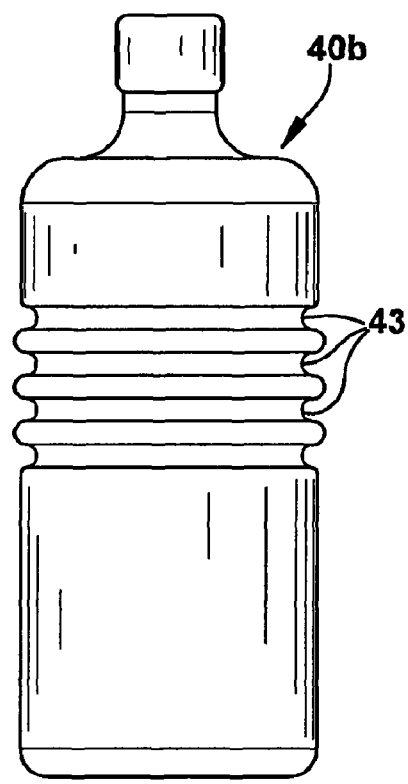

FIGS. 4A and 4B each illustrate a container having an irregular surface. FIG. 4A is a front view of a container 40a having raised ridges 42 along one side of the container. The opposing side of the container has a smooth surface. FIG. 4B is a front view of a container 40b having circumferentially recessed rings 43 along the length of the container. It should be noted that cylindrically shaped articles having areas of compound curves such as containers 40a and 40b are not excluded from the articles claimed herein.

Figure 5:
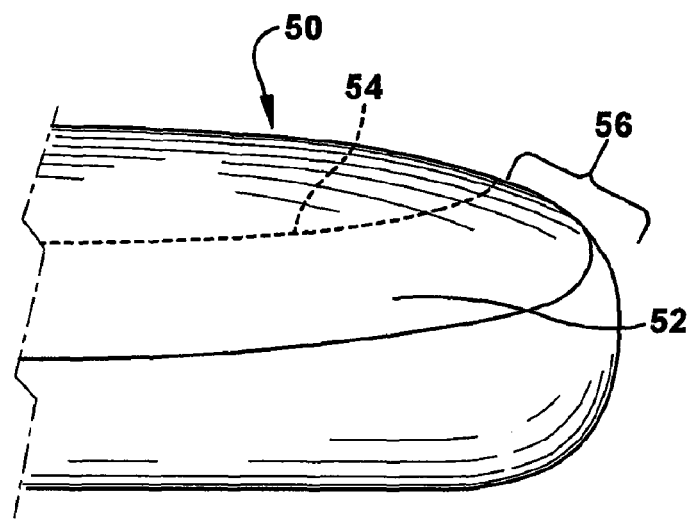
FIG. 5 is a three dimensional view of a portion of a labeled article having a compound curve.

FIG. 5 is a schematic three dimensional view of a portion of a container to which the label has been applied. The container 50 has surface comprising a compound curve. Label 52 is applied to the container and covers a portion of the compound curved area. Line 54 indicates the outer boundary to which typical pressure sensitive labels can be applied with out the formation of defects in the label. Area 56 indicates the expanded billboard area that is obtainable with the present labels without the formation of defects such wrinkles, edge lift or darts.

Shrink Film

The polymeric films useful in the label constructions of the present invention possess balanced shrink properties. The balanced shrink properties allow the film to tighten darts and wrinkles initially formed in the label when the label is applied over curved surfaces and allow the darts and wrinkles to be wiped down with minimal graphics distortion of the label. Films having unbalanced shrink, that is, films having a high degree of shrink in one direction and low to moderate shrink in the other direction are not particularly useful because while darts may be removed in one direction, in the other direction the formation of darts is exacerbated. Useful films having balanced shrink allow for a wider variety of label shapes to be applied to a wider variety of container shapes.

In one embodiment, the polymeric film has an ultimate shrinkage (S) as measured by ASTM procedure D1204 in at least one direction of at least 10% at 90° C. and in the other direction, the shrinkage is S±20%. In another embodiment, the film has an ultimate shrinkage (S) in at least one direction of about 10% to about 50% at 70° C. and in the other direction, the shrinkage is S±20%. In one embodiment, the ultimate shrinkage (S) is at least 10% at 90° C. and in the other direction, the shrinkage is S±10%. The shrink initiation temperature of the film, in one embodiment, is in the range of about 60° C. to about 80° C.

The shrink film must be thermally shrinkable and yet have sufficient stiffness to be dispensed using conventional labeling equipment and processes, including printing, die-cutting and label transfer. The stiffness of the film required depends on the size of the label, the speed of application and the labeling equipment being used. In one embodiment, the shrink film has a stiffness in the machine direction (MD) of at least 5 mN, as measured by the L&W Bending Resistance test. In one embodiment, the shrink film has a stiffness of at least 10 mN, or at least 20 mN. The stiffness of the shrink film is important for proper dispensing of labels over a peel plate at higher line speeds.

In one embodiment, the die-cut labels are applied to the article or container in an automated labeling line process at a line speed of at least 100 units per minute, or at least 250 units per minute or at least 500 units per minute.

In one embodiment, the shrink film has a 2% secant modulus as measured by ASTM D882 in the machine direction (MD) of about 20,000 to about 400,000 psi, and in the transverse (or cross) direction (TD) of about 20,000 to about 400,000 psi. In another embodiment, the 2% secant modulus of the film is about 30,000 to about 300,000 in the machine direction and about 30,000 to about 300,000 in the transverse direction. The film may have a lower modulus in the transverse direction than in the machine direction so that the label is easily dispensed (MD) while maintaining sufficiently low modulus in the TD for conformability and/or squeezability.

The polymeric film may be made by conventional processes. For example, the film may be produced using a double bubble process, tenter process or may comprise a blown film.

The shrink film useful in the label may be a single layer construction or a multilayer construction. The layer or layers of the shrink film may be formed from a polymer chosen from polyester, polyolefin, polyvinyl chloride, polystyrene, polylactic acid, copolymers and blends thereof.

Polyolefins comprise homopolymers or copolymers of olefins that are aliphatic hydrocarbons having one or more carbon to carbon double bonds. Olefins include alkenes that comprise 1-alkenes, also known as alpha-olefins, such as 1-butene and internal alkenes having the carbon to carbon double bond on nonterminal carbon atoms of the carbon chain, such as 2-butene, cyclic olefins having one or more carbon to carbon double bonds, such as cyclohexene and norbornadiene, and cyclic polyenes which are noncyclic aliphatic hydrocarbons having two or more carbon to carbon double bonds, such as 1,4-butadiene and isoprene. Polyolefins comprise alkene homopolymers from a single alkene monomer, such as a polypropylene homopolymer, alkene copolymers from at least one alkene monomer and one or more additional olefin monomers where the first listed alkene is the major constituent of the copolymer, such as a propylene-ethylene copolymer and a propylene-ethylene-butadiene copolymer, cyclic olefin homopolymers from a single cyclic olefin monomer, and cyclic olefin copolymers from at least one cyclic olefin monomer and one or more additional olefin monomers wherein the first listed cyclic olefin is the major constituent of the copolymer, and mixtures of any of the foregoing olefin polymers.

In one embodiment, the shrink film is a multilayer film comprising a core layer and at least one skin layer. The skin layer may be a printable skin layer. In one embodiment, the multilayer shrink film comprises a core and two skin layers, wherein in at least one skin layer is printable. The multilayer shrink film may be a coextruded film.

The film can range in thickness from 0.5-20, or 0.5-12, or 0.5-8, or 1-3 mils. The difference in the layers of the film can include a difference in thermoplastic polymer components, in additive components, in orientation, in thickness, or a combination thereof. The thickness of the core layer can be 50-95%, or 60-95% or 70-90% of the thickness of the film.

The thickness of a skin layer or of a combination of two skin layers can be 5-50%, or 5-40% or 10-30% of the thickness of the film.

The film can be further treated on one surface or both the upper and lower surfaces to enhance performance in terms of printability or adhesion to an adhesive. The treatment can comprise applying a surface coating such as, for example, a lacquer, applying a high energy discharge to include a corona discharge to a surface, applying a flame treatment to a surface, or a combination of any of the foregoing treatments. In an embodiment of the invention, the film is treated on both surfaces, and in another embodiment the film is treated on one surface with a corona discharge and is flame treated on the other surface.

The layers of the shrink film may contain pigments, fillers, stabilizers, light protective agents or other suitable modifying agents if desired. The film may also contain anti-block, slip additives and anti-static agents. Useful anti-block agents include inorganic particles, such as clays, talc, calcium carbonate and glass. Slip additives useful in the present invention include polysiloxanes, waxes, fatty amides, fatty acids, metal soaps and particulate such as silica, synthetic amorphous silica and polytetrafluoroethylene powder. Anti-static agents useful in the present invention include alkali metal sulfonates, polyether-modified polydiorganosiloxanes, polyalkylphenylsiloxanes and tertiary amines.

In one embodiment, the shrink film is microperforated to allow trapped air to be released from the interface between the label and the article to which it is adhered. In another embodiment, the shrink film is permeable to allow fluid to escape from the adhesive or from the surface of the article to escape. In one embodiment, vent holes or slits are provided in the shrink film.

Adhesives

A description of useful pressure sensitive adhesives may be found in *Encyclopedia of Polymer Science and Engineering*, Vol. 13, Wiley-Interscience Publishers (New York, 1988). Additional description of useful PSAs may be found in *Polymer Science and Technology*, Vol. 1, Interscience Publishers (New York, 1964). Conventional PSAs, including acrylic-based PSAs, rubber-based PSAs and silicone-based PSAs are useful. The PSA may be a solvent based or may be a water based adhesive. Hot melt adhesives may also be used. In one embodiment, the PSA comprises an acrylic emulsion adhesive.

The adhesive and the side of the film to which the adhesive is applied have sufficient compatibility to enable good adhesive anchorage. In one embodiment, the adhesive is chosen so that the labels may be cleanly removed from PET containers up to 24 hours after application. The adhesive is also chosen so that the adhesive components do not migrate into the film.

In one embodiment, the adhesive may be formed from an acrylic based polymer. It is contemplated that any acrylic based polymer capable of forming an adhesive layer with sufficient tack to adhere to a substrate may function in the present invention. In certain embodiments, the acrylic polymers for the pressure-sensitive adhesive layers include those formed from polymerization of at least one alkyl acrylate monomer containing from about 4 to about 12 carbon atoms in the alkyl group, and present in an amount from about 35-95% by weight of the polymer or copolymer, as disclosed in U.S. Pat. No. 5,264,532. Optionally, the acrylic based pressure-sensitive adhesive might be formed from a single polymeric species.

The glass transition temperature of a PSA layer comprising acrylic polymers can be varied by adjusting the amount of polar, or "hard monomers", in the copolymer, as taught by U.S. Pat. No. 5,264,532, incorporated herein by reference. The greater the percentage by weight of hard monomers is an acrylic copolymer, the higher the glass transition temperature. Hard monomers contemplated useful for the present invention include vinyl esters, carboxylic acids, and methacrylates, in concentrations by weight ranging from about zero to about thirty-five percent by weight of the polymer.

The PSA can be acrylic based such as those taught in U.S. Pat. No. 5,164,444 (acrylic emulsion), U.S. Pat. No. 5,623, 011 (tackified acrylic emulsion) and U.S. Pat. No. 6,306,982. The adhesive can also be rubber-based such as those taught in U.S. Pat. No. 5,705,551 (rubber hot melt). It can also be radiation curable mixture of monomers with initiators and other ingredients such as those taught in U.S. Pat. No. 5,232, 958 (UV cured acrylic) and U.S. Pat. No. 5,232,958 (EB cured). The disclosures of these patents as they relate to acrylic adhesives are hereby incorporated by reference.

Commercially available PSAs are useful in the invention. Examples of these adhesives include the hot melt PSAs available from H.B. Fuller Company, St. Paul, Minn. as HM-1597, HL-2207-X, HL-2115-X, HL-2193-X. Other useful commercially available PSAs include those available from Century Adhesives Corporation, Columbus, Ohio. Another useful acrylic PSA comprises a blend of emulsion polymer particles with dispersion tackifier particles as generally described in Example 2 of U.S. Pat. No. 6,306,982. The polymer is made by emulsion polymerization of 2-ethylhexyl acrylate, vinyl acetate, dioctyl maleate, and acrylic and methacrylic comonomers as described in U.S. Pat. No. 5,164,444 resulting in the latex particle size of about 0.2 microns in weight average diameters and a gel content of about 60%.

A commercial example of a hot melt adhesive is H2187-01, sold by Ato Findley, Inc., of Wauwutasa, Wis. In addition, rubber based block copolymer PSAs described in U.S. Pat. No. 3,239,478 also can be utilized in the adhesive constructions of the present invention, and this patent is hereby incorporated by a reference for its disclosure of such hot melt adhesives that are described more fully below.

In another embodiment, the pressure-sensitive adhesive comprises rubber based elastomer materials containing useful rubber based elastomer materials include linear, branched, grafted, or radial block copolymers represented by the diblock structure A-B, the triblock A-B-A, the radial or coupled structures $(A-B)_n$, and combinations of these where A represents a hard thermoplastic phase or block which is non-rubbery or glassy or crystalline at room temperature but fluid at higher temperatures, and B represents a soft block which is rubbery or elastomeric at service or room temperature. These thermoplastic elastomers may comprise from about 75% to about 95% by weight of rubbery segments and from about 5% to about 25% by weight of non-rubbery segments.

The non-rubbery segments or hard blocks comprise polymers of mono- and polycyclic aromatic hydrocarbons, and more particularly vinyl-substituted aromatic hydrocarbons that may be monocyclic or bicyclic in nature. Rubbery materials such as polyisoprene, polybutadiene, and styrene butadiene rubbers may be used to form the rubbery block or segment. Particularly useful rubbery segments include polydienes and saturated olefin rubbers of ethylene/butylene or ethylene/propylene copolymers. The latter rubbers may be obtained from the corresponding unsaturated polyalkylene moieties such as polybutadiene and polyisoprene by hydrogenation thereof.

The block copolymers of vinyl aromatic hydrocarbons and conjugated dienes that may be utilized include any of those that exhibit elastomeric properties. The block copolymers may be diblock, triblock, multiblock, starblock, polyblock or graftblock copolymers. Throughout this specification, the terms diblock, triblock, multiblock, polyblock, and graft or grafted-block with respect to the structural features of block copolymers are to be given their normal meaning as defined in the literature such as in the Encyclopedia of Polymer Science and Engineering, Vol. 2, (1985) John Wiley & Sons, Inc., New York, pp. 325-326, and by J. E. McGrath in Block Copolymers, Science Technology, Dale J. Meier, Ed., Harwood Academic Publishers, 1979, at pages 1-5.

Such block copolymers may contain various ratios of conjugated dienes to vinyl aromatic hydrocarbons including those containing up to about 40% by weight of vinyl aromatic hydrocarbon. Accordingly, multi-block copolymers may be utilized which are linear or radial symmetric or asymmetric and which have structures represented by the formulae A-B, A-B-A, A-B-A-B, B-A-B, $(AB)_{0,1,2}$ ... BA, etc., wherein A is a polymer block of a vinyl aromatic hydrocarbon or a conjugated diene/vinyl aromatic hydrocarbon tapered copolymer block, and B is a rubbery polymer block of a conjugated diene.

The block copolymers may be prepared by any of the well-known block polymerization or copolymerization procedures including sequential addition of monomer, incremental addition of monomer, or coupling techniques as illustrated in, for example, U.S. Pat. Nos. 3,251,905; 3,390,207; 3,598, 887; and 4,219,627. As well known, tapered copolymer blocks can be incorporated in the multi-block copolymers by copolymerizing a mixture of conjugated diene and vinyl aromatic hydrocarbon monomers utilizing the difference in their copolymerization reactivity rates. Various patents describe the preparation of multi-block copolymers containing tapered copolymer blocks including U.S. Pat. Nos. 3,251,905; 3,639, 521; and 4,208,356, the disclosures of which are hereby incorporated by reference.

Conjugated dienes that may be utilized to prepare the polymers and copolymers are those containing from 4 to about 10 carbon atoms and more generally, from 4 to 6 carbon atoms. Examples include from 1,3-butadiene, 2-methyl-1,3-butadiene(isoprene), 2,3-dimethyl-1,3-butadiene, chloroprene, 1,3-pentadiene, 1,3-hexadiene, etc. Mixtures of these conjugated dienes also may be used.

Examples of vinyl aromatic hydrocarbons which may be utilized to prepare the copolymers include styrene and the various substituted styrenes such as o-methylstyrene, p-methylstyrene, p-tert-butylstyrene, 1,3-dimethylstyrene, alpha-methylstyrene, beta-methylstyrene, p-isopropylstyrene, 2,3-dimethylstyrene, o-chlorostyrene, p-chlorostyrene, o-bromostyrene, 2-chloro-4-methylstyrene, etc.

Many of the above-described copolymers of conjugated dienes and vinyl aromatic compounds are commercially available. The number average molecular weight of the block copolymers, prior to hydrogenation, is from about 20,000 to about 500,000, or from about 40,000 to about 300,000.

The average molecular weights of the individual blocks within the copolymers may vary within certain limits. In most instances, the vinyl aromatic block will have a number average molecular weight in the order of about 2000 to about 125,000, or between about 4000 and 60,000. The conjugated diene blocks either before or after hydrogenation will have number average molecular weights in the order of about 10,000 to about 450,000, or from about 35,000 to 150,000.

Also, prior to hydrogenation, the vinyl content of the conjugated diene portion generally is from about 10% to about 80%, or from about 25% to about 65%, particularly 35% to 55% when it is desired that the modified block copolymer exhibit rubbery elasticity. The vinyl content of the block copolymer can be measured by means of nuclear magnetic resonance.

Specific examples of diblock copolymers include styrene-butadiene (SB), styrene-isoprene (SI), and the hydrogenated derivatives thereof. Examples of triblock polymers include styrene-butadiene-styrene (SBS), styrene-isoprene-styrene (SIS), alpha-methylstyrene-butadiene-alpha-methylstyrene, and alpha-methylstyrene-isoprene alpha-methylstyrene. Examples of commercially available block copolymers useful as the adhesives in the present invention include those available from Kraton Polymers LLC under the KRATON trade name.

Upon hydrogenation of the SBS copolymers comprising a rubbery segment of a mixture of 1,4 and 1,2 isomers, a styrene-ethylene-butylene styrene (SEBS) block copolymer is obtained. Similarly, hydrogenation of an SIS polymer yields a styrene-ethylene propylene-styrene (SEPS) block copolymer.

The selective hydrogenation of the block copolymers may be carried out by a variety of well known processes including hydrogenation in the presence of such catalysts as Raney nickel, noble metals such as platinum, palladium, etc., and soluble transition metal catalysts. Suitable hydrogenation processes which can be used are those wherein the diene-containing polymer or copolymer is dissolved in an inert hydrocarbon diluent such as cyclohexane and hydrogenated by reaction with hydrogen in the presence of a soluble hydrogenation catalyst. Such procedures are described in U.S. Pat. Nos. 3,113,986 and 4,226,952, the disclosures of which are incorporated herein by reference. Such hydrogenation of the block copolymers which are carried out in a manner and to extent as to produce selectively hydrogenated copolymers having a residual unsaturation content in the polydiene block of from about 0.5% to about 20% of their original unsaturation content prior to hydrogenation.

In one embodiment, the conjugated diene portion of the block copolymer is at least 90% saturated and more often at least 95% saturated while the vinyl aromatic portion is not significantly hydrogenated. Particularly useful hydrogenated block copolymers are hydrogenated products of the block copolymers of styrene-isoprene-styrene such as a styrene-(ethylene/propylene)-styrene block polymer. When a polystyrene-polybutadiene-polystyrene block copolymer is hydrogenated, it is desirable that the 1,2-polybutadiene to 1,4-polybutadiene ratio in the polymer is from about 30:70 to about 70:30. When such a block copolymer is hydrogenated, the resulting product resembles a regular copolymer block of ethylene and 1-butene (EB). As noted above, when the conjugated diene employed as isoprene, the resulting hydrogenated product resembles a regular copolymer block of ethylene and propylene (EP).

A number of selectively hydrogenated block copolymers are available commercially from Kraton Polymers under the general trade designation "Kraton G." One example is Kraton G1652 which is a hydrogenated SBS triblock comprising about 30% by weight of styrene end blocks and a midblock which is a copolymer of ethylene and 1-butene (EB). A lower molecular weight version of G1652 is available under the designation Kraton G1650. Kraton G1651 is another SEBS block copolymer which contains about 33% by weight of styrene. Kraton G1657 is an SEBS diblock copolymer which contains about 13% w styrene. This styrene content is lower than the styrene content in Kraton G1650 and Kraton G1652.

In another embodiment, the selectively hydrogenated block copolymer is of the formula:

$$B_n(AB)_oA_p$$

wherein n=0 or 1; o is 1 to 100; p is 0 or 1; each B prior to hydrogenation is predominantly a polymerized conjugated diene hydrocarbon block having a number average molecular weight of about 20,000 to about 450,000; each A is predominantly a polymerized vinyl aromatic hydrocarbon block having a number average molecular weight of from about 2000 to about 115,000; the blocks of A constituting about 5% to about 95% by weight of the copolymer; and the unsaturation of the block B is less than about 10% of the original unsaturation. In other embodiments, the unsaturation of block B is reduced upon hydrogenation to less than 5% of its original value, and the average unsaturation of the hydrogenated block copolymer is reduced to less than 20% of its original value.

The block copolymers may also include functionalized polymers such as may be obtained by reacting an alpha, beta-olefinically unsaturated monocarboxylic or dicarboxylic acid reagent onto selectively hydrogenated block copolymers of vinyl aromatic hydrocarbons and conjugated dienes as described above. The reaction of the carboxylic acid reagent in the graft block copolymer can be effected in solutions or by a melt process in the presence of a free radical initiator.

The preparation of various selectively hydrogenated block copolymers of conjugated dienes and vinyl aromatic hydrocarbons which have been grafted with a carboxylic acid reagent is described in a number of patents including U.S. Pat. Nos. 4,578,429; 4,657,970; and 4,795,782, and the disclosures of these patents relating to grafted selectively hydrogenated block copolymers of conjugated dienes and vinyl aromatic compounds, and the preparation of such compounds are hereby incorporated by reference. U.S. Pat. No. 4,795,782 describes and gives examples of the preparation of the grafted block copolymers by the solution process and the melt process. U.S. Pat. No. 4,578,429 contains an example of grafting of Kraton G1652 (SEBS) polymer with maleic anhydride with 2,5-dimethyl-2,5-di(t-butylperoxy) hexane by a melt reaction in a twin screw extruder.

Examples of commercially available maleated selectively hydrogenated copolymers of styrene and butadiene include Kraton FG1901X, FG1921X, and FG1924X, often referred to as maleated selectively hydrogenated SEBS copolymers.

FG1901X contains about 1.7% w bound functionality as succinic anhydride and about 28% w of styrene. FG1921X contains about 1% w of bound functionality as succinic anhydride and 29% w of styrene. FG1924X contains about 13% styrene and about 1% bound functionality as succinic anhydride.

Useful block copolymers also are available from Nippon Zeon Co., 2-1, Marunochi, Chiyoda-ku, Tokyo, Japan. For example, Quintac 3530 is available from Nippon Zeon and is believed to be a linear styrene-isoprene-styrene block copolymer.

Unsaturated elastomeric polymers and other polymers and copolymers which are not inherently tacky can be rendered tacky when compounded with an external tackifier. Tackifiers, are generally hydrocarbon resins, wood resins, rosins, rosin derivatives, and the like, which when present in concentrations ranging from about 40% to about 90% by weight of the total adhesive composition, or from about 45% to about 85% by weight, impart pressure-sensitive adhesive characteristics to the elastomeric polymer adhesive formulation. Compositions containing less than about 40% by weight of tackifier additive do not generally show sufficient "quickstick," or initial adhesion, to function as a pressure-sensitive adhesive, and therefore are not inherently tacky. Compositions with too high a concentration of tackifying additive, on the other hand, generally show too little cohesive strength to work properly in most intended use applications of constructions made in accordance with the instant invention.

It is contemplated that any tackifier known by those of skill in the art to be compatible with elastomeric polymer compositions may be used with the present embodiment of the invention. One such tackifier, found useful is Wingtak 10, a synthetic polyterpene resin that is liquid at room temperature, and sold by the Goodyear Tire and Rubber Company of Akron, Ohio. Wingtak 95 is a synthetic tackifier resin also available from Goodyear that comprises predominantly a polymer derived from piperylene and isoprene. Other suitable tackifying additives may include Escorez 1310, an aliphatic hydrocarbon resin, and Escorez 2596, a $C_5$-$C_9$ (aromatic modified aliphatic) resin, both manufactured by Exxon of Irving, Tex. Of course, as can be appreciated by those of skill in the art, a variety of different tackifying additives may be used to practice the present invention.

In addition to the tackifiers, other additives may be included in the PSAs to impart desired properties. For example, plasticizers may be included, and they are known to decrease the glass transition temperature of an adhesive composition containing elastomeric polymers. An example of a useful plasticizer is Shellflex 371, a naphthenic processing oil available from Shell Lubricants of Texas. Antioxidants also may be included on the adhesive compositions. Suitable antioxidants include Irgafos 168 and Irganox 565 available from Ciba-Geigy, Hawthorne, N.Y. Cutting agents such as waxes and surfactants also may be included in the adhesives.

The pressure sensitive adhesive may be applied from a solvent, emulsion or suspension, or as a hot melt. The adhesive may be applied to the inner surface of the shrink film by any known method. For example, the adhesive may be applied by die coating curtain coating, spraying, dipping, rolling, gravure or flexographic techniques. The adhesive may be applied to the shrink film in a continuous layer, a discontinuous layer or in a pattern. The pattern coated adhesive layer substantially covers the entire inner surface of the film. As used herein, "substantially covers" is intended to mean the pattern in continuous over the film surface, and is not intended to include adhesive applied only in a strip along the leading or trailing edges of the film or as a "spot weld" on the film.

In one embodiment, an adhesive deadener is applied to portions of the adhesive layer to allow the label to adhere to complex shaped articles. In one embodiment, non-adhesive material such as ink dots or microbeads are applied to at least a portion of the adhesive surface to allow the adhesive layer to slide on the surface of the article as the label is being applied and/or to allow air trapped at the interface between the label and the article to escape.

A single layer of adhesive may be used or multiple adhesive layers may be used. Depending on the shrink film used and the article or container to which the label is to be applied, it may be desirable to use a first adhesive layer adjacent to the shrink film and a second adhesive layer having a different composition on the surface to be applied to the article or container for sufficient tack, peel strength and shear strength.

In one embodiment, the pressure sensitive adhesive has sufficient shear or cohesive strength to prevent excessive shrink-back of the label where adhered to the article upon the action of heat after placement of the label on the article, sufficient peel strength to prevent the film from label from lifting from the article and sufficient tack or grab to enable adequate attachment of the label to the article during the labeling operation. In one embodiment, the adhesive moves with the label as the shrink film shrinks upon the application of heat. In another embodiment, the adhesive holds the label in position so that as the shrink film shrinks, the label does not move.

The heat shrinkable film may include other layers in addition to the monolayer or multilayer heat shrinkable polymeric film. In one embodiment, a metalized coating of a thin metal film is deposited on the surface of the polymeric film. The heat shrinkable film may also include a print layer on the polymer film. The print layer may be positioned between the heat shrink layer and the adhesive layer, or the print layer may be on the outer surface of the shrink layer. In one embodiment, the film is reverse printed with a design, image or text so that the print side of the skin is in direct contact with the container to which the film is applied. In this embodiment, the film is transparent.

The labels of the present invention may also contain a layer of an ink-receptive composition that enhances the printability of the polymeric shrink layer or metal layer if present, and the quality of the print layer thus obtained. A variety of such compositions are known in the art, and these compositions generally include a binder and a pigment, such as silica or talc, dispersed in the binder. The presence of the pigment decreases the drying time of some inks. Such ink-receptive compositions are described in U.S. Pat. No. 6,153,288 (Shih et al) and the disclosure of this patent is hereby incorporated by reference.

The print layer may be an ink or graphics layer, and the print layer may be a mono-colored or multi-colored print layer depending on the printed message and/or the intended pictorial design. These include variable imprinted data such as serial numbers, bar codes, trademarks, etc. The thickness of the print layer is typically in the range of about 0.5 to about 10 microns, and in one embodiment about 1 to about 5 microns, and in another embodiment about 3 microns. The inks used in the print layer include commercially available water-based, solvent-based or radiation-curable inks. Examples of these inks include Sun Sheen (a product of Sun Chemical identified as an alcohol dilutable polyamide ink), Suntex MP (a product of Sun Chemical identified as a solvent-based ink formulated for surface printing acrylic coated substrates, PVDC coated substrates and polyolefin films), X-Cel (a product of Water Ink Technologies identified as a water-based film ink for printing film substrates), Uvilith AR-109 Rubine Red (a product of Daw Ink identified as a UV ink) and CLA91598F (a product of Sun Chemical identified as a multibond black solvent-based ink).

In one embodiment, the print layer comprises a polyester/vinyl ink, a polyamide ink, an acrylic ink and/or a polyester ink. The print layer may be formed in the conventional manner by, for example, gravure, flexographic or UV flexographic printing or the like, an ink composition comprising a resin of the type described above, a suitable pigment or dye and one or more suitable volatile solvents onto one or more desired areas of the film. After application of the ink composition, the volatile solvent component(s) of the ink composition evaporate(s), leaving only the non-volatile ink components to form the print layer.

The adhesion of the ink to the surface of the polymeric shrink film or metal layer if present can be improved, if necessary, by techniques well known to those skilled in the art. For example, as mentioned above, an ink primer or other ink adhesion promoter can be applied to the metal layer or the polymeric film layer before application of the ink. Alternatively the surface of the polymeric film can be corona treated or flame treated to improve the adhesion of the ink to the polymeric film layer.

Useful ink primers may be transparent or opaque and the primers may be solvent based or water-based. In one embodiment, the primers are radiation curable (e.g., UV). The ink primer may comprise a lacquer and a diluent. The lacquer may be comprised of one or more polyolefins, polyamides, polyesters, polyester copolymers, polyurethanes, polysulfones, polyvinylidine chloride, styrene-maleic anhydride copolymers, styrene-acrylonitrile copolymers, ionomers based on sodium or zinc salts or ethylene methacrylic acid, polymethyl methacrylates, acrylic polymers and copolymers, polycarbonates, polyacrylonitriles, ethylene-vinyl acetate copolymers, and mixtures of two or more thereof. Examples of the diluents that can be used include alcohols such as ethanol, isopropanol and butanol; esters such as ethyl acetate, propyl acetate and butyl acetate; aromatic hydrocarbons such as toluene and xylene; ketones such as acetone and methyl ethyl ketone; aliphatic hydrocarbons such as heptane; and mixtures thereof. The ratio of lacquer to diluent is dependent on the viscosity required for application of the ink primer, the selection of such viscosity being within the skill of the art. The ink primer layer may have a thickness of from about 1 to about 4 microns or from about 1.5 to about 3 microns.

A transparent polymer protective topcoat or overcoat layer may be present in the labels of the invention. The protective topcoat or overcoat layer provide desirable properties to the label before and after the label is affixed to a substrate such as a container. The presence of a transparent topcoat layer over the print layer may, in some embodiments provide additional properties such as antistatic properties stiffness and/or weatherability, and the topcoat may protect the print layer from, e.g., weather, sun, abrasion, moisture, water, etc. The transparent topcoat layer can enhance the properties of the underlying print layer to provide a glossier and richer image. The protective transparent protective layer may also be designed to be abrasion resistant, radiation resistant (e.g, UV), chemically resistant, thermally resistant thereby protecting the label and, particularly the print layer from degradation from such causes. The protective overcoat may also contain antistatic agents, or anti-block agents to provide for easier handling when the labels are being applied to containers at high speeds. The protective layer may be applied to the print layer by techniques known to those skilled in the art. The polymer film may be deposited from a solution, applied as a preformed film (laminated to the print layer), etc.

When a transparent topcoat or overcoat layer is present, it may have a single layer or a multilayered structure. The thickness of the protective layer is generally in the range of about 12.5 to about 125 microns, and in one embodiment about 25 to about 75 microns. Examples of the topcoat layers are described in U.S. Pat. No. 6,106,982 which is incorporated herein by reference.

The protective layer may comprise polyolefins, thermoplastic polymers of ethylene and propylene, polyesters, polyurethanes, polyacryls, polymethacryls, epoxy, vinyl acetate homopolymers, co- or terpolymers, ionomers, and mixtures thereof.

The transparent protective layer may contain UV light absorbers and/or other light stabilizers. Among the UV light absorbers that are useful are the hindered amine absorbers available from Ciba Specialty Chemical under the trade designations "Tinuvin". The light stabilizers that can be used include the hindered amine light stabilizers available from Ciba Specialty Chemical under the trade designations Tinuvin 111, Tinuvin 123, (bis-(1-octyloxy-2,2,6,6-tetramethyl-4-piperidinyl) sebacate; Tinuvin 622, (a dimethyl succinate polymer with 4-hydroxy-2,2,6,6-tetramethyl-1-piperidniethanol); Tinuvin 770 (bis-(2,2,6,6-tetramethyl-4-piperidinyl)-sebacate); and Tinuvin 783. Additional light stabilizers include the hindered amine light stabilizers available from Ciba Specialty Chemical under the trade designation "Chemassorb", especially Chemassorb 119 and Chemassorb 944. The concentration of the UV light absorber and/or light stabilizer is in the range of up to about 2.5% by weight, and in one embodiment about 0.05% to about 1% by weight.

The transparent protective layer may contain an antioxidant. Any antioxidant useful in making thermoplastic films can be used. These include the hindered phenols and the organo phosphites. Examples include those available from Ciba Specialty Chemical under the trade designations Irganox 1010, Irganox 1076 or Irgafos 168. The concentration of the antioxidant in the thermoplastic film composition may be in the range of up to about 2.5% by weight, and in one embodiment about 0.05% to about 1% by weight.

A release liner may be adhered to the adhesive layer to protect the adhesive layer during transport, storage and handling prior to application of the label to a substrate. The liner allows for efficient handling of an array of individual labels after the labels are die cut and the matrix is stripped from the layer of facestock material and up to the point where the individual labels are dispensed in sequence on a labeling line. The release liner may have an embossed surface and/or have non-adhesive material, such as microbeads or printed ink dots, applied to the surface of the liner.

Process

The process of applying the labels to articles or containers involves non-traditional operations and equipment. The process begins with traditional dispensing equipment that separates the label from the release liner via a peel plate or tip that presents the label with exposed adhesive to the container or article to be decorated. Referring to FIGS. 6A to 6D, the label 62, which has a central portion 61 and a peripheral portion 63 surrounding the central portion and having an outer boundary defined by the label edges, is contacted to the container 60 initially by applying pressure to the label in the central portion. Having the initial tack point(s) 64 located in a more central portion of the label rather than on the leading edge or peripheral portion of the label facilitates a more even distribution of any darts or wrinkles formed between the leading and trailing edges of the applied label. This in turn facilitates removal of the darts or wrinkles with the application of heat.

For those articles having both compound curves and relatively planar regions, the label may be initially contacted with the container not on a compound curve, but closer to or within a relatively planar area of the container surface.

In one embodiment, the label is pre-heated to soften the shrink film and/or activate the adhesive layer.

Pressure is applied to the transferred label with a series of brushes, rollers, wipers, squeegees, pneumatic rollers, or walking beam in a center outward direction, as indicated by arrows 65, to obtain intimate contact between the label and the container or article. This process is referred to herein as "wipe down" of the label. The center to edge wiping motion forces any air trapped beneath the label to the outer edges, as indicated by arrows 66, and creates smaller, more evenly distributed darts at the edges of the label. As the label covers the complex curves of the article, excess label material accumulates in the form of darts, pleats, channeling, bubbling and other application defects generally in the peripheral portion of the label. Heat is applied to at least a portion of the label to fully and smoothly adhere the label to the container as shown in FIG. 6D.

Figure 7A:
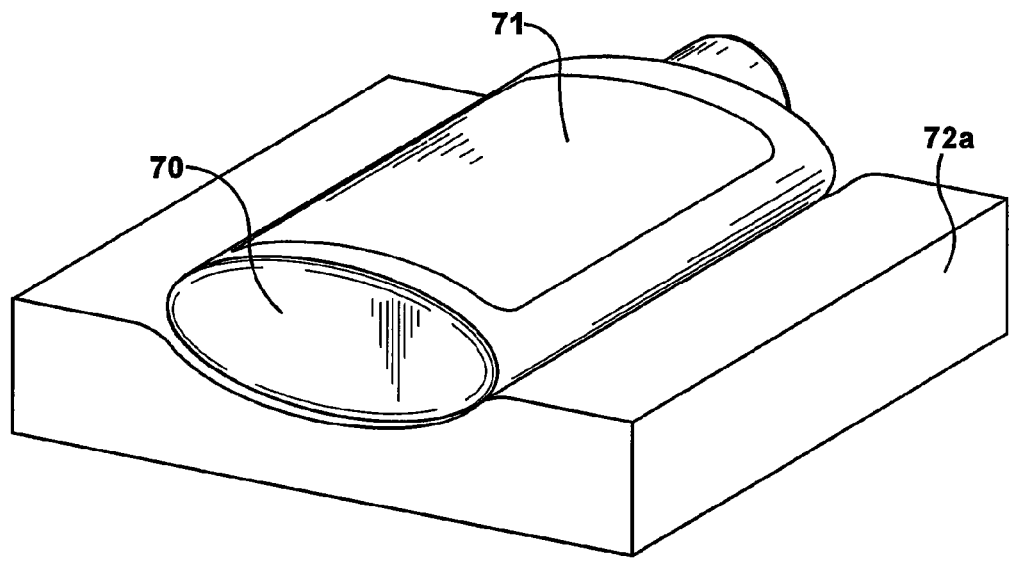
FIGS. 7A and 7B schematically illustrate an embodiment of the process of applying a label to an article wherein a walking beam is used.
Figure 7B:
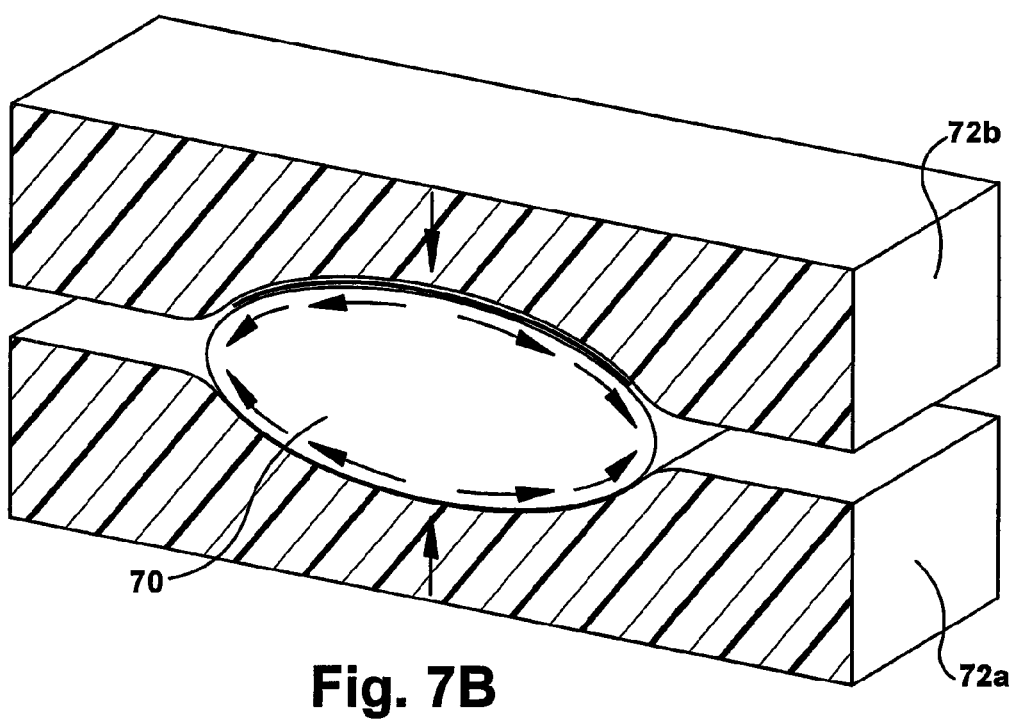

In one embodiment, pressure is applied to the label using a walking beam system equipped with a foam roller or foam covered beam. The foam roller or beam applies downward pressure in the longitudinal direction to the central region of the label and then proceeds to the outer edges of the label, directing any air trapped under the label and the pleats, wrinkles and/or other defects to the outer edges of the label. This embodiment is illustrated in FIG. 7, wherein container 70 having label 71 applied thereto, is positioned on lower foam block 72a of a walking beam. Upper foam block 72b applies downward pressure onto label 71 on container 70 to push air from under the central portion of the label to the periphery of the label as label and container are compressed between the foam blocks of the walking beam.

Once the label is applied and initial wipe down is completed, the excess label material darts and defects are eliminated by heating at least a portion the label to shrink the darts and/or wrinkles. The label may be heated via passage through a heat tunnel, forced air, steam tunnel, direct contact heat pads or forms. In one embodiment, the label is heated to a temperature of at least 40° C. In one embodiment, the label is heated to at least 60° C., or at least 70° C., or at least 80° C.

A subsequent wipe down of the label may be performed to eliminate any remaining darts or wrinkles in the label. Pressure is again applied to the label in a center outward direction to the label. The second wipe down can be performed by a series of rollers, wipers, squeegees, brushes, pneumatic rollers or a walking beam. The subsequent wipe down may be performed concurrently with the application of heat to the label, or subsequent to the application of heat.

When applying the label to an article or container, the label may be initially tacked to the article by applying pressure in a contact region of the label, and then applying pressure across the label in a direction to a first edge of the label. The contact region may be in the center of the label or may be proximate to a second edge of the label opposite to the first edge. For example, initial contact may be made in the center of the label and then pressure is applied in an outward direction to the edges or periphery of the label. Alternatively, initial contact may be made near one edge of the label and then pressure applied across the label to the opposite edge of the label. When applying the label to the article or container, it is desirable to move the excess label material, i.e., the darts or wrinkles, to at least one label edge. The excess material is typically moved in the direction of the compound curve(s), where the heat applied to the label will shrink the label and allow it to conform to the compound curve and eliminate any darts or wrinkles formed. Heat and pressure may be applied to the label simultaneously.

In one embodiment of the invention, the method of applying a label to an article includes the steps of: providing an article having a surface including at least one compound curve; providing a label including (i) a heat shrinkable film having an inner surface and an outer surface; and (ii) a layer of pressure sensitive adhesive on the inner surface of the heat shrinkable film, wherein the label has a first edge and a contact region; contacting the adhesive layer in the contact region with the article; and applying heat and pressure simultaneously to the label in a direction from the contact region to the first edge such that the first edge of the label adheres to article and the label shrinks to conform to the compound curve of the article, wherein the heat and pressure are applied by a heated conformable membrane. The contact region may be located in or near the center of the label. Alternatively, the contact region may be proximate to a second edge of the label opposite the first edge.

Figure 8:
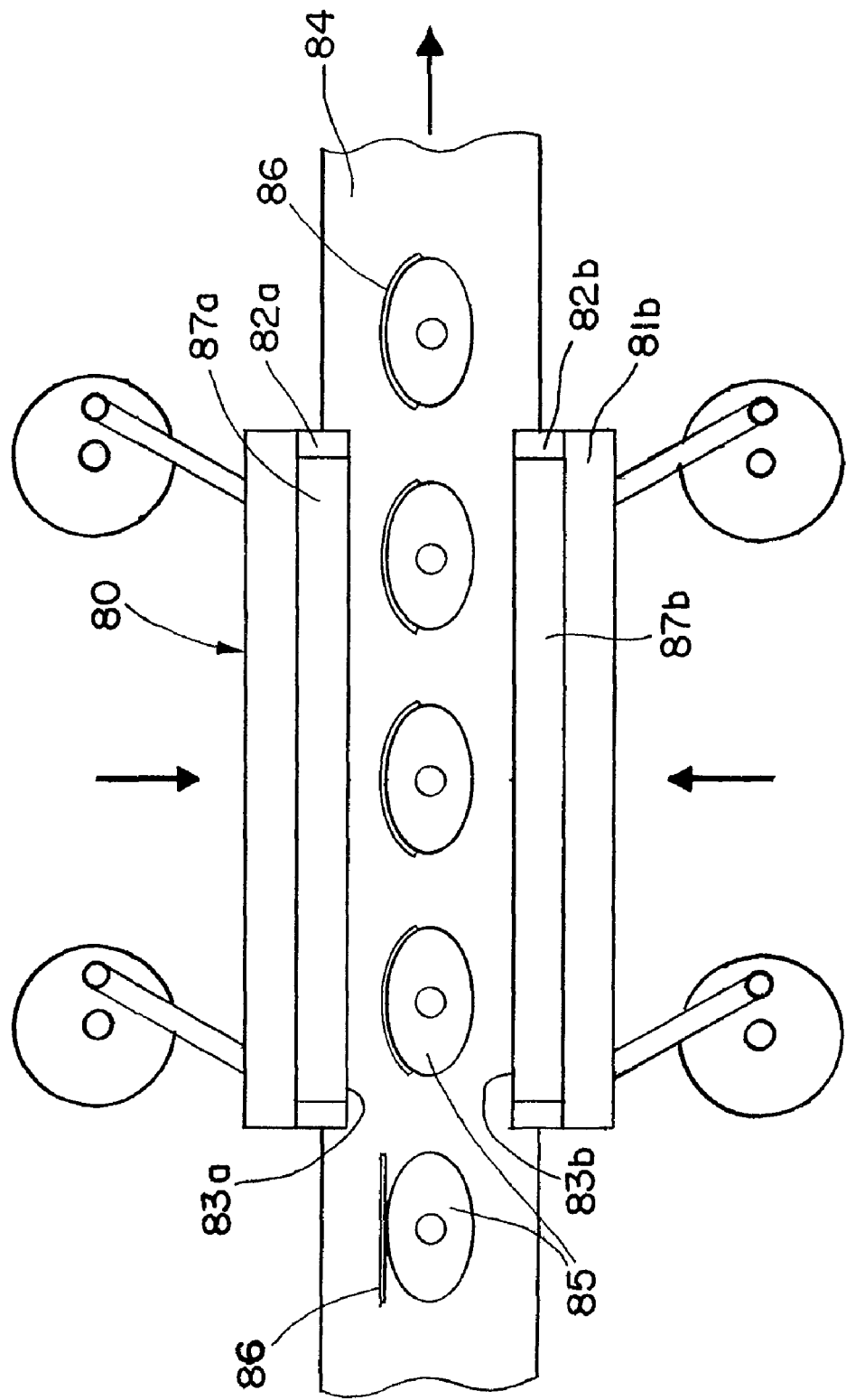
FIG. 8 is a top view of a walking beam conveyor having a heated bladder.

The heated membrane may, in one embodiment, be pressed against the label on the article or container by a walking beam having a heated bladder. Referring to FIG. 8, the walking beam 80 includes a containment box 82a, 82b on each of its longitudinal members 81a, 81b, the containment box having a flexible and conformable membrane 83a, 83b at its inner surface to create a bladder 87a, 87b. The heated membrane 83a, 83b is positioned onto the passing labeled container 85 via a walking beam mechanism, with the container 85 in a horizontal or vertical position. The membrane may be constructed of a conformable, high temperature, non-porous high-release material. The bladder 87a, 87b is filled with a heated liquid or gas so as to heat the membrane 83a, 83b. The heat from the membrane 83a, 83b is transferred to the label 86 on the container 85. A label may be applied to one or both sides of the container. For the sake of simplicity, a label is applied to only one surface of the container in FIG. 8

In this method, the label 86 is first applied to a center section of the container 85 with a standard peel tip dispensing process (not shown) with leading and trailing edges not tacked down. The labeled container 85 is moved into the walking beam station 80 via a conveyor 84 and the walking beam closes in on one or more containers 85. Pressure from the heated, expanded bladder 87a is applied to the label 86 on the container 85 at an initial contact point in the center of the label in an outward direction to the edges of the label, pushing any air under the label from the center of the label to the outer edges of the label. The bladder is pre-heated to a target temperature based on the line speed and label material used. The heat from the bladder membrane 83a softens the label 86 and shrinks the label. The simultaneous application of heat and pressure from the bladder membrane 83a to the label forces the label to conform to the surface of the container 85, including the compound curve(s) of the container. An optional subsequent heating step may be used to further shrink the label. An advantage of this method is that labels may be applied to a wide variety of container shapes without the need for retooling. In addition, high speed processing is possible due to the continuous heat recovery of the bladder.

Figures 9A, 9B:
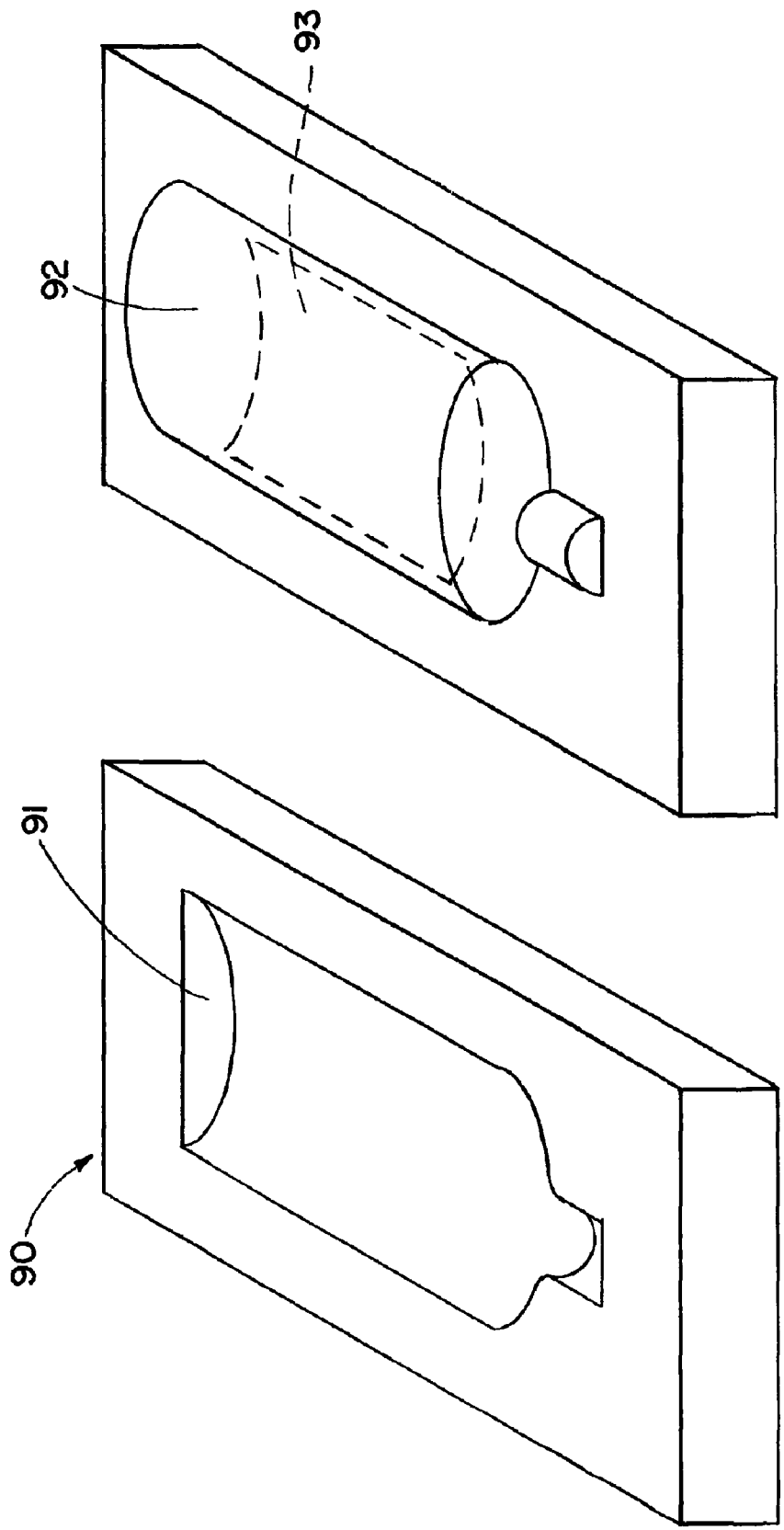
FIGS. 9A and 9B are a schematic view of a heated cavity containment box of a walking beam conveyor.

FIGS. 9A and 9B illustrate another embodiment of the invention wherein a walking beam with a heated cavity is used to apply the label to the article or container. For illustration purposes, only one side of the walking beam conveyor is shown. The walking beam containment box 90 includes an internally heated bottle-shaped cavity 91. The shape of the cavity 91 is configured to correspond to the container or article 92 to which the label 93 is applied. The cavity is preheated to a target temperature based on the line speed and label material selected. The heated cavity is positioned onto the passing labeled container via a walking beam conveyor. The walking beam may contain a single or multiple cavities for applying heat and pressure to a single or multiple containers. The labeled surface of the container 92 faces the interior of the cavity 91. The interior of the cavity 91 may be lined with a conformable, soft material such as a silicon rubber sheet having imbedded electric heater wires vulcanized in place. Heat and pressure from the cavity 91 softens the label 93 and shrinks the label. Pressure applied by the soft cavity forces air from under the label to the edges of the label to eliminate bubbles. The simultaneous application of heat and pressure from the heated cavity to the label 93 forces the label to conform to the surface of the container, including the compound curve(s) of the container. The excess label material, i.e., darts and wrinkles, are eliminated by the shrinkage of the label. An optional subsequent heating step may be used to further shrink the label. The advantage of this method is that the exact shape of the cavity provides full bottle contact to enable rapid heat transfer and fill pressure to force air out from under the label.

Figure 10:
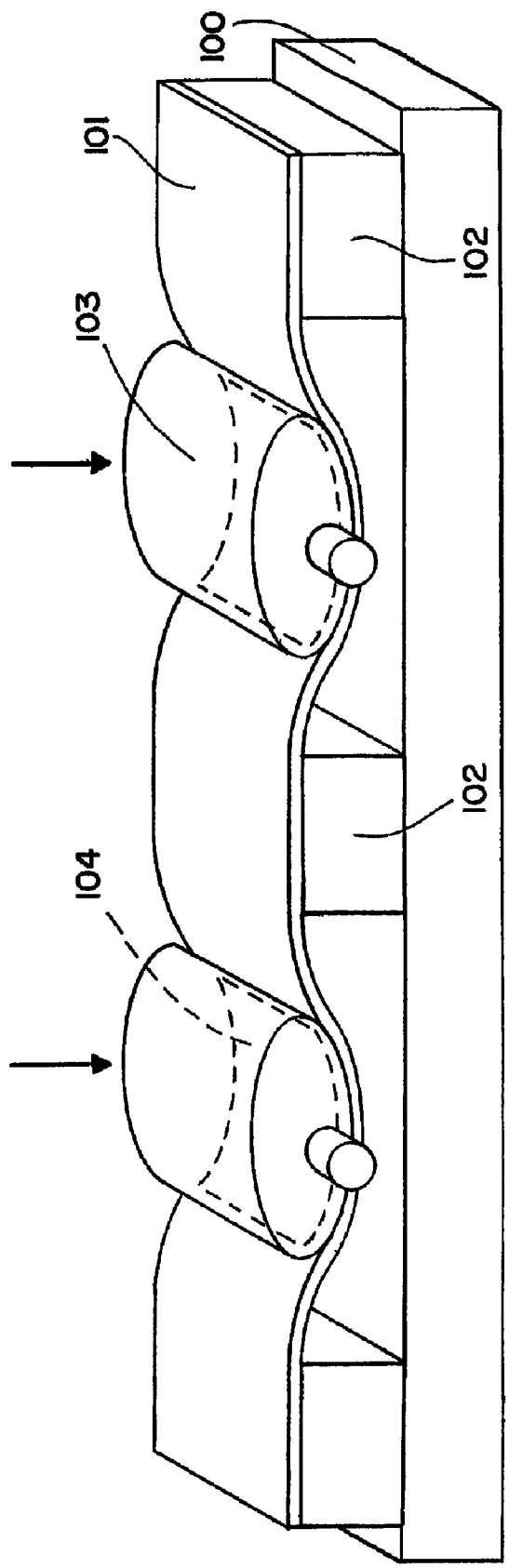
FIG. 10 is a schematic view of a walking beam conveyor arm having a draped flexible membrane.

FIG. 10 illustrates another embodiment of the invention for applying labels to a container having compound curves. In this embodiment, a walking beam containment box 100 includes an internally heated soft, flexible pad 101 suspended between at least two frame members 102 as its contact surface. For illustration purposes, only one side of the walking beam conveyor is shown. The heated pad 101 is positioned onto the passing labeled containers via a walking beam conveyor in either the vertical or horizontal direction. The label 104 is first applied to a contact point on the container with a standard peel tip dispensing process (not shown) with the leading and trailing edges of the label not tacked down. The container 103 with the label adhered thereto is moved into the walking beam station via a conveyor and the walking beam moves inward to enclose the container. The heated, flexible pad 101 is positioned to push the label 104 toward the container while removing air from under the label. The pad 101 is pre-heated to a target temperature based on the line speed and label material selected. The heated pad may be porous or non-porous. The simultaneous application of heat and pressure from the heated pad 101 to the label 104 forces the label to conform to the surface of the container, including the compound curve(s) of the container. The heat source may be one or more of radiant electric, IR electric, forced hot air and electric resistance heat integrated with the heated pad. An optional subsequent heating step may be used to further shrink the label. An advantage of this method includes the ability to apply labels to a wide variety of container shapes without the need for retooling.

Figure 11A:
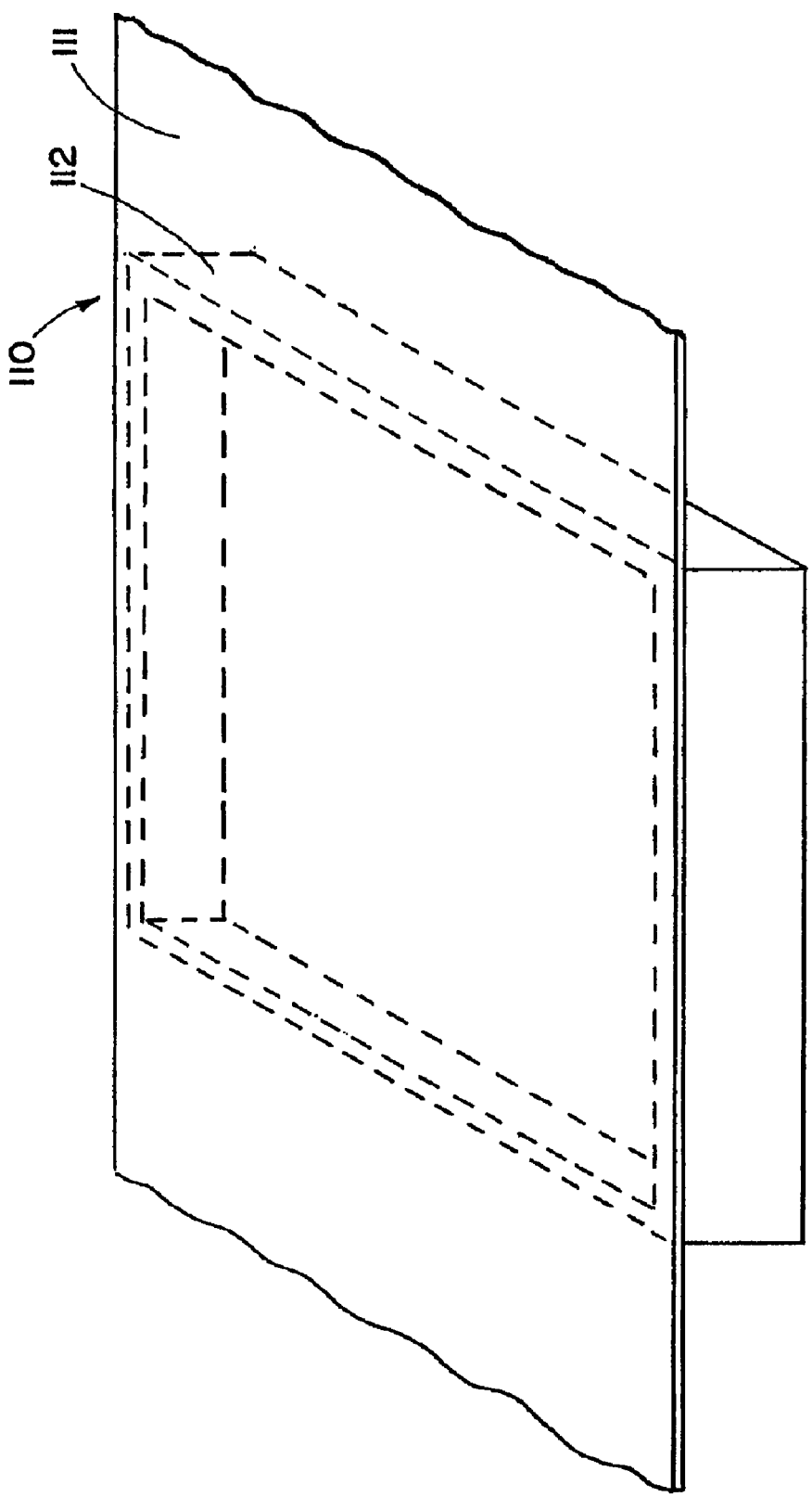
FIGS. 11A and 11B are schematic views of a rectangular framed containment box of a walking beam conveyor having a heated membrane.
Figure 11B:
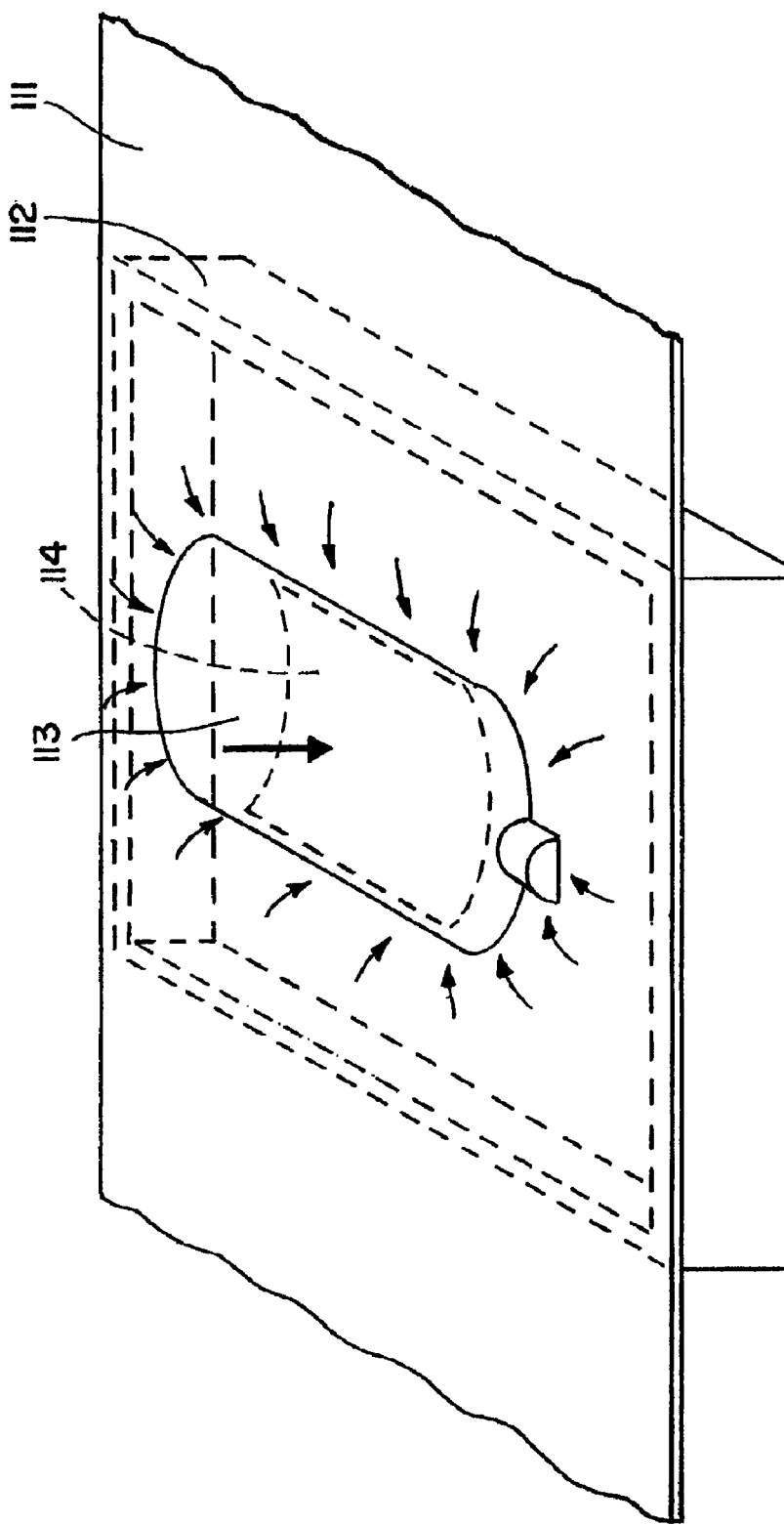

FIGS. 11A and 11B illustrate another embodiment of the invention wherein a walking beam conveyor includes a rectangular framed containment box 110 having a flexible heated membrane mounted to the rectangular frame. In this embodiment, an extensible, internally heated membrane 111, such as a silicone rubber sheet, is mounted over an open rectangular frame 112 along each side of a walking beam conveyor. For illustration purposes, only one side of the walking beam conveyor is shown. A label may be applied to one or both sides of the container 113. The label 114 is first applied to a contact point on the container with a standard peel tip dispensing process (not shown) with the leading and trailing edges of the label not tacked down. The membrane 111 is mounted so that tension is applied across the membrane. The perimeter dimensions of the rectangular frame 111 are larger than the overall profile of the container 113 to be labeled. In one embodiment, the depth of the frame is greater than one-half the thickness of the container to be labeled to allow the container to penetrate the plane of the membrane. The open/close motion of the walking beam provides sufficient force to trap the container 113 between a supported membrane 111 on each side of the walking beam, or one side of the walking beam, to force the container 113 into the frame 112 while the heated membrane 111 conforms to the surface of the container 113. The membrane is pre-heated to a target temperature based on the line speed and label material selected. The dwell time of the closed walking beam can be controlled through the walking beam station by the design of the cam system. The walking beam may contain a plurality of rectangular frames to apply labels to a plurality of containers. As the walking beam opens and reciprocates, the labeled container may optionally be enclosed within the membranes of the walking beam a second time for a second application of heat and pressure. The simultaneous application of heat and pressure from the membrane 111 to the label 114 forces the label to conform to the surface of the container 113, including the compound curve(s) of the container. An optional subsequent heating step may be used to further shrink the label 114. The advantage of this embodiment is that the generic shape of the rectangular frame allows containers having various shapes to be labeled without the necessity of providing unique frames.

Figure 12A:
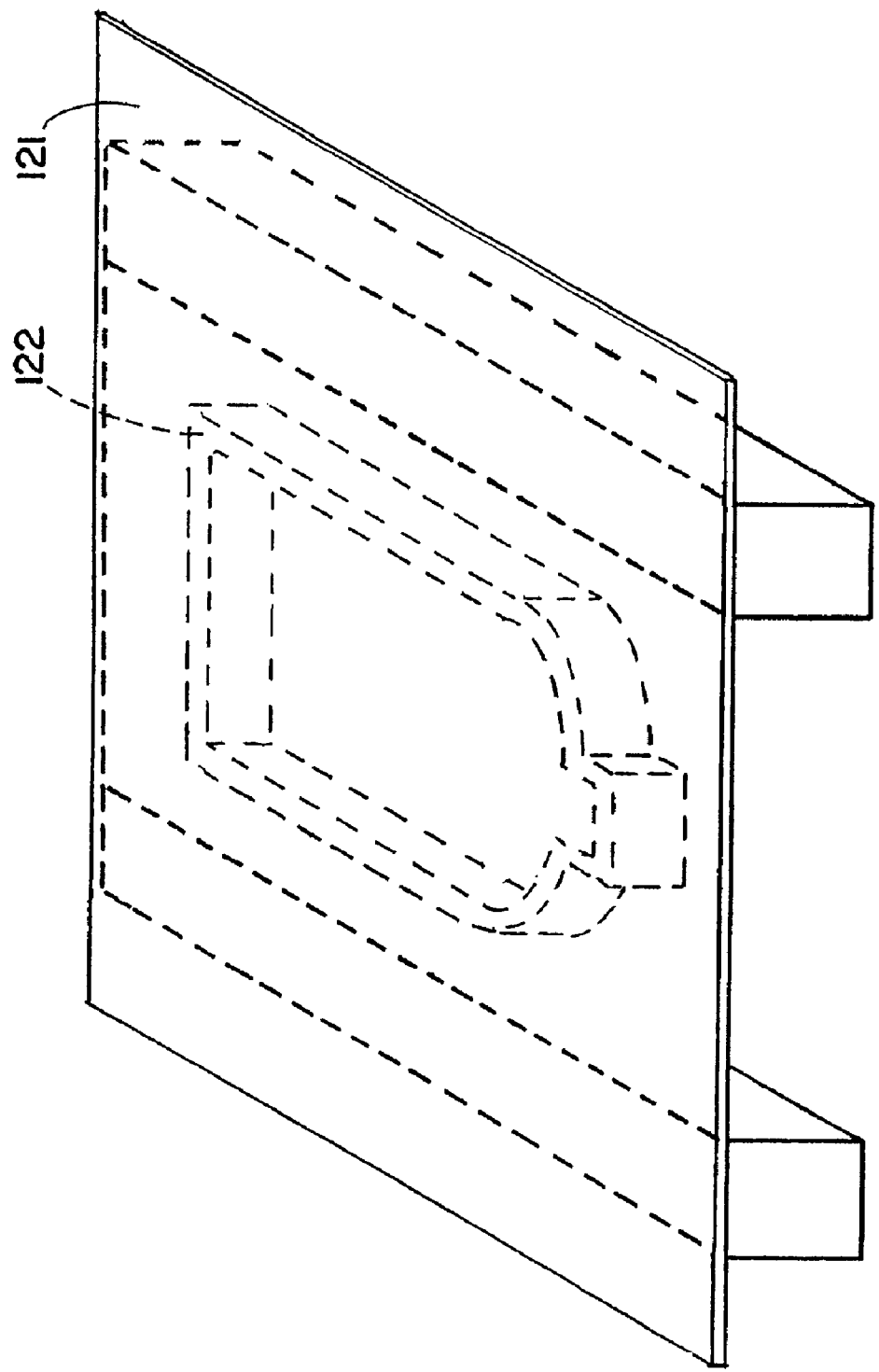
FIGS. 12A and 12B are schematic views of a framed containment box of a walking beam conveyor having a heated membrane, wherein the shape of the frame corresponds to the shape of the article to be labeled.
Figure 12B:
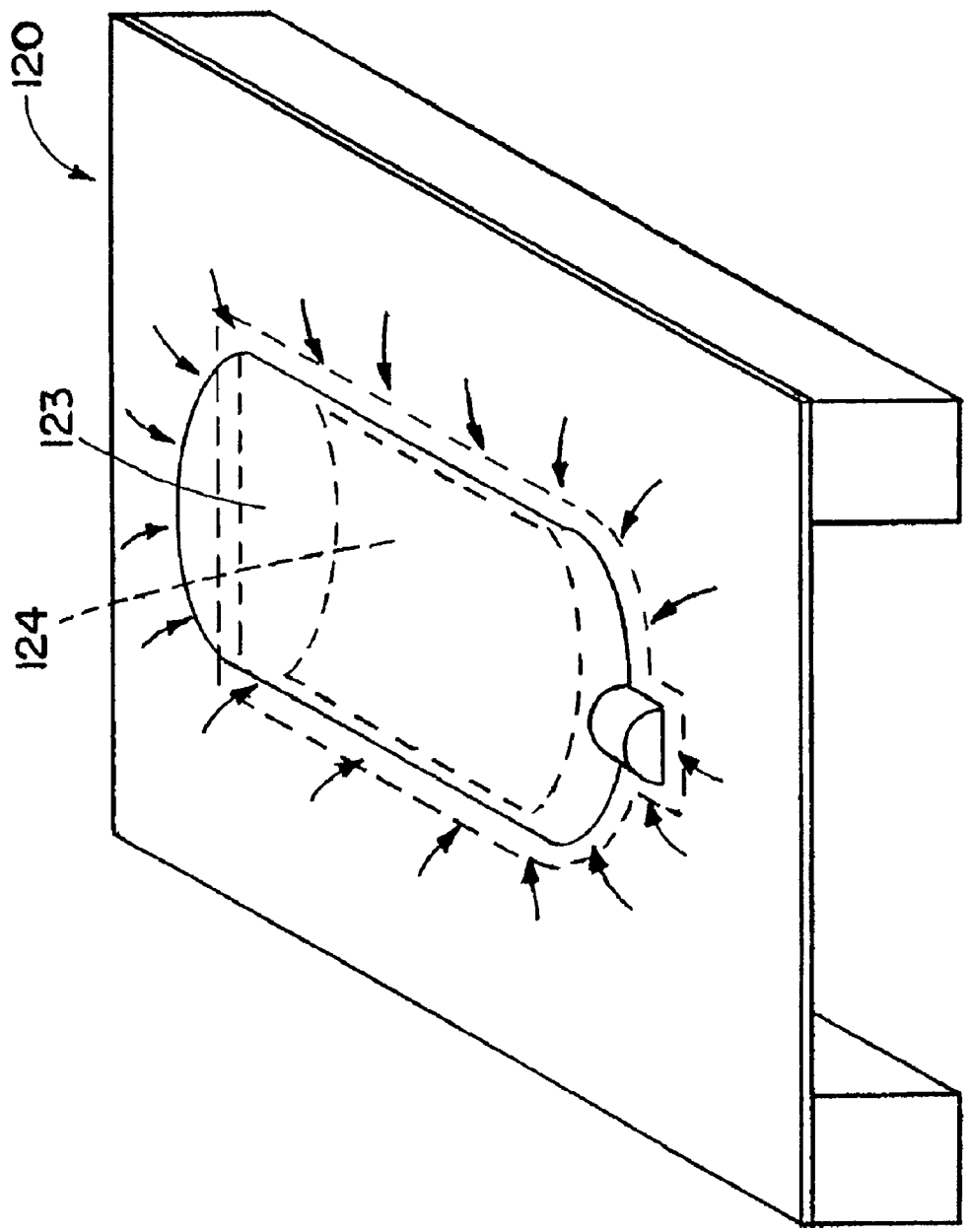

FIGS. 12A and 12B illustrate an embodiment that is similar to that illustrated in FIGS. 11A and 11B. In this embodiment, an extensible, internally heated membrane 121, such as a silicone rubber sheet, is mounted over an open frame 122 along each side of a walking beam conveyor 120. For illustration purposes, only one side of the walking beam conveyor is shown. The dimensions of the frame 121 are configured to correspond to the overall profile of the container 123 to be labeled and are slightly larger to allow space for the membrane as it is pushed into the frame 122. The membrane 121 is mounted so that tension is applied across the membrane. In one embodiment, the depth of the frame is greater than one-half the thickness of the container to be labeled to allow the container to penetrate the plane of the membrane. The open/close motion of the walking beam provides sufficient force to trap the container 123 between a supported membrane 121 on each side of the walking beam, or one side of the walking beam, to force the container 123 into the frame 122 while the heated membrane 121 conforms to the surface of the container 123. The membrane is pre-heated to a target temperature based on the line speed and label material selected. The dwell time of the closed walking beam can be controlled through the walking beam station by the design of the cam system. The walking beam may contain a plurality of shaped frames to apply labels to a plurality of similarly shaped containers. As the walking beam opens and reciprocates, the labeled container may optionally be enclosed within the membranes of the walking beam a second time for a second application of heat and pressure. The simultaneous application of heat and pressure from the membrane 121 to the label 124 forces the label to conform to the surface of the container 123, including the compound curve(s) of the container. An optional subsequent heating step may be used to further shrink the label. An advantage of this embodiment is that the shaped frame enables better conformability to the contours around the top and bottom of the containers.

Figure 13:
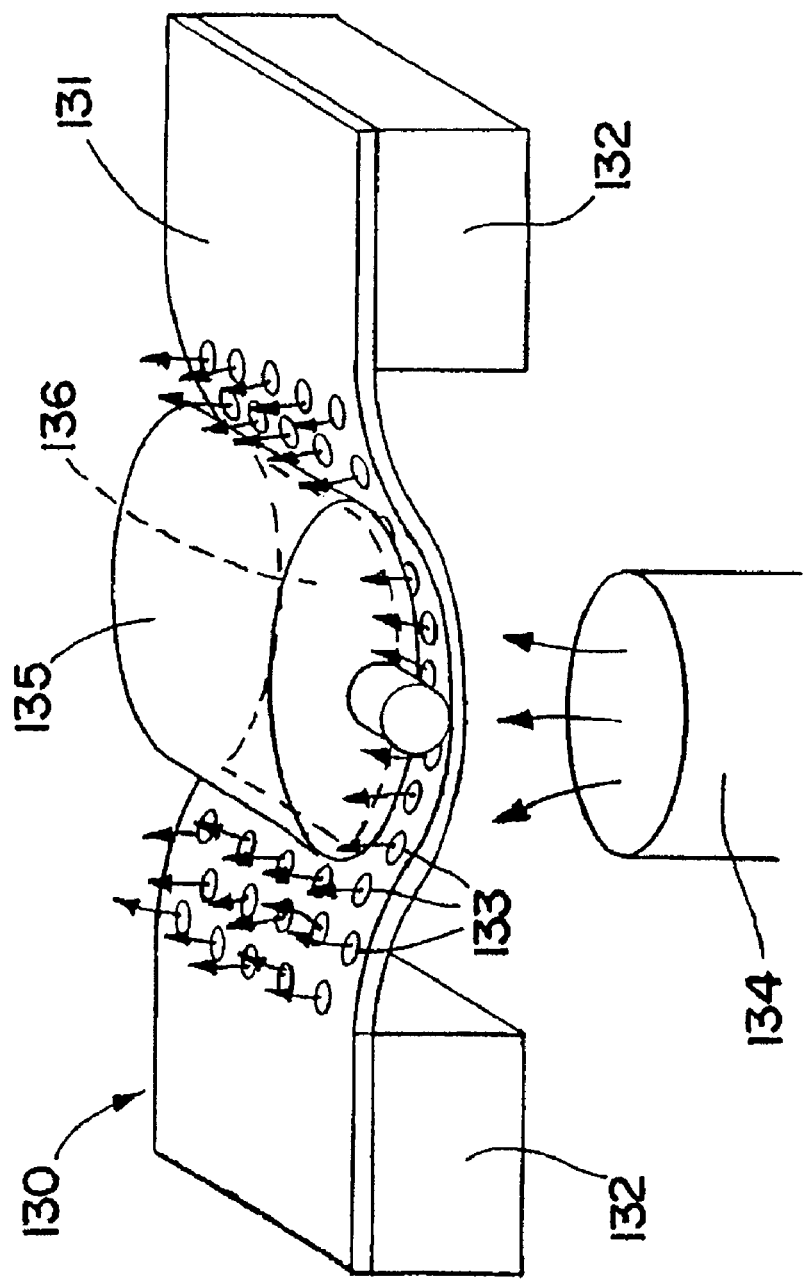
FIG. 13 is a schematic view of a walking beam conveyor having a porous membrane.

FIG. 13 illustrates an embodiment of the invention wherein a walking beam includes a flexible porous mesh that is externally heated with hot air. In this embodiment, a walking beam containment box 130 includes an externally heated soft, flexible mesh or fabric 131 suspended between at least two frame members 132 as its contact surface. For illustration purposes, only one side of the walking beam conveyor is shown. The heated mesh is positioned onto the passing labeled containers via a walking beam conveyor in the horizontal direction. The label 136 is first applied to a contact point or region on the container with a standard peel tip dispensing process (not shown) with the leading and trailing edges of the label not tacked down. The container 135 with the label adhered thereto is moved into the walking beam station via a conveyor and the walking beam moves inward to enclose the container. The heated, flexible mesh 131 is positioned to push the label 136 toward the container while removing air from under the label. The mesh 131 is heated to a target temperature with a source of hot air 134 based on the line speed and label material selected. The hot air from the hot air source 134 is blown through the pores 133 of the mesh to heat the label on the container 135. The mesh may be constructed, for example, from a mesh screen, a non-woven fabric or a thin, porous foam sheeting. The simultaneous application of heat and pressure from the heated mesh to the label forces the label to conform to the surface of the container, including the compound curve(s) of the container. An optional subsequent heating step may be used to further shrink the label 136. The advantages of this method include excellent contact with the container and heat transfer from the heated air to the labeled container. This method enables very good recovery of heat and recovery of the shape of the mesh. This embodiment may be used on a variety of container shapes and is able to achieve higher temperatures based on the thermal stability of the mesh material.

Figure 14B:
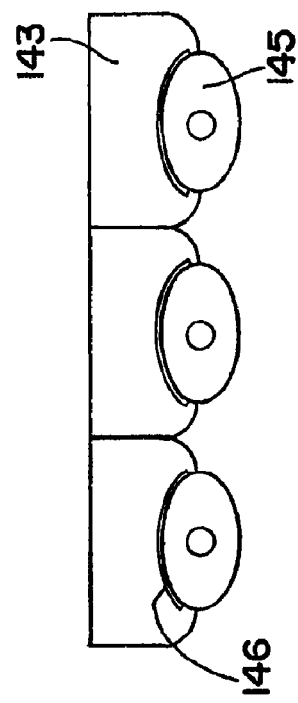
FIGS. 14A and 14B are side views of a walking beam containment box including an expandable bladder.
Figure 14A:
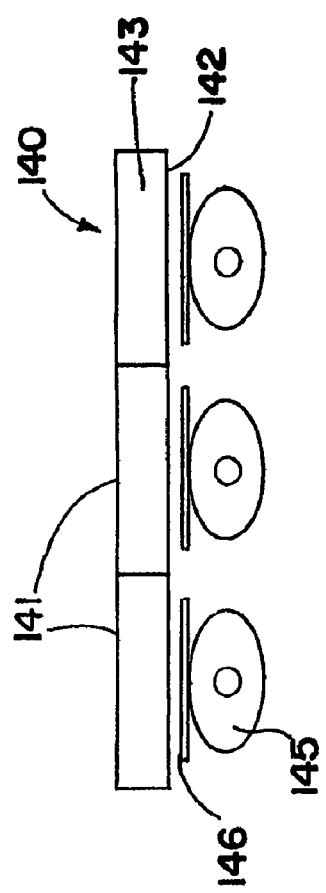

FIGS. 14A and 14B illustrate an embodiment of the invention wherein a walking beam 140 includes one or more containment boxes, each having an expandable membrane 142 as its contact surface to create an expandable bladder 143. For illustration purposes, only one side of the walking beam conveyor is shown. The heated membrane 143 is positioned onto the passing labeled container 145 via a walking beam mechanism, with the container 145 in a horizontal or vertical position. The membrane may be constructed of a conformable, high temperature, non-porous high-release material. The bladder 143 is filled with a heated liquid or gas so as to heat the membrane 142. The heat from the membrane 142 is transferred to the label 146 on the container 145. A label may be applied to one or both sides of the container. A label may be applied to one or both sides of the container.

In this method, the label 146 is first applied to a center section of the container 145 with a standard peel tip dispensing process (not shown) with leading and trailing edges not tacked down. The labeled container 145 is moved into the walking beam station 140 via a conveyor and the walking beam closes in on one or more containers 145. Pressure from the heated, expanded bladder 143 is applied to the label 146 on the container 145 at a contact point in the center of the label in an outward direction to the edges of the label, pushing any air under the label from the center of the label to the outer edges of the label. The expandable bladder is pre-heated to a target temperature based on the line speed and label material used. The heat from the bladder membrane 142 softens the label 146 and shrinks the label. The simultaneous application of heat and pressure from the bladder membrane 142 to the label forces the label to conform to the surface of the container, including the compound curve(s) of the container. An optional subsequent heating step may be used to further shrink the label. The advantages of this method include the application of labels to a wide variety of container shapes without the need for retooling. In addition, high speed processing is possible due to the continuous heat recovery of the bladder. Another advantage is that the application of heat and pressure in a center outward direction in both the vertical and horizontal direction assures proper label application without generating label defects. Furthermore, due to the limited number of moving mechanical components, low maintenance is required.

The labeled article of the present invention may be used in a variety of applications, including, but not limited to personal care products, household chemical products, food and beverages, toys, electronics, pharmaceuticals, health care products, industrial products and appliances.

EXAMPLES

The following examples are intended only to illustrate methods and embodiments in accordance with the invention, and as such should not be construed as imposing limitations upon the claims.

Example 1

A pressure sensitive shrink label is constructed from a 3 mil thick low density polyethylene multilayer shrink film designated CorrTuff from Sealed Air. The film is coated with an acrylic emulsion adhesive S692N from Avery Dennison. The adhesive is carried on a paper Glassine BG-40 silicone coated release liner. The label is oversized, having the dimensions of approximately 5×3.5 inches, which is 20% greater than the industry standard recommended label size for the bottle to which the label is applied.

A 15 oz Johnson & Johnson Baby Lotion bottle having compound curves is filled with water, capped and processed through a Label-Aire 9000 series labeler at 100 bottles per minute (BPM). The labeler has dual-feed screws with matched speed top and lower belts with Label-Aire 2115-CD labeler heads with high torque stepper motor drive. The labels are pressed down with a walking beam type wipe down apparatus providing straight out, center outward forces to direct the trapped air beneath the label and resultant dart/pleat defects to the edge of the label. The oversized label as applied to the bottle initially results in unacceptable small darts and pleat defects around the perimeter of the label. The labeled bottle is then processed through a Leister hot forced air, conveyor wipe down system at 100 bpm. High velocity 260° C. hot air heats the bottle and label to 50° C., shrinking and taking up the excess label material darts and pleats down to the bottle surface. The label is wiped down with a walking beam for good label contact. The darts shrink and are easily wiped flat after application of heat.

The finished labeled bottle with larger label area and larger graphics content is smoothly wiped down without the darts, pleats, ridges or wrinkle defects present in typical pressure sensitive oversized labels. The darts do not return upon aging. Table 1 below shows the properties of the label components.

Example 2

In accordance with the process described in Example 1, a pressure sensitive shrink label constructed from a 2 mil thick polypropylene multilayer shrink film designated CZPA 200 from Innovia is applied to the bottle having compound curves. After initial wipe down, medium sized darts are formed. High velocity hot air heats the bottle and label to 100° C. The darts shrink and are easily wiped flat after application of heat. The darts do not return after aging.

Example 3

In accordance with the process described in Example 1, a pressure sensitive shrink label constructed from a 2 mil thick polylactic acid single layer shrink film designated EARTH-FIRST PLA from Plastic Suppliers is applied to the bottle having compound curves. After initial wipe down, medium sized darts are formed. High velocity hot air heats the bottle and label to 70° C. The darts shrink and are easily wiped flat after application of heat. The darts do not return after aging.

Comparative Example 4

In accordance with the process described in Example 1, a pressure sensitive shrink label constructed from a 2 mil thick machine direction oriented polypropylene single layer roll-on-shrink-on film from Avery Dennison is applied to the bottle having compound curves. High velocity hot air heats the bottle and label to 70° C. The darts formed at the top and bottom of the label shrink upon application of heat and are easily wiped down, while the darts formed at the leading and trailing edges remain. The removed darts do not return upon aging.

Comparative Example 5

In accordance with the process described in Example 1, a pressure sensitive shrink label constructed from a 1.9 mil thick transverse direction oriented polyvinyl chloride single layer film designated Penta Label from Kloeckner is applied to the bottle having compound curves. High velocity hot air heats the bottle and label to 60° C. The darts formed at the leading and trailing edges of the label shrink upon application of heat and are easily wiped down, while the darts formed at the top and bottom of the label remain. The removed darts do not return upon aging.

Comparative Example 6

In accordance with the process described in Example 1, a pressure sensitive shrink label constructed from a 2 mil thick transverse direction oriented glycol modified polyethylene terephthalate (PETG) single layer film designated Fusion 1775E from Mitsubishi is applied to the bottle having compound curves. High velocity hot air heats the bottle and label to 50° C. The darts formed at the leading and trailing edges of the label shrink upon application of heat and are easily wiped down, while the darts formed at the top and bottom of the label remain. The removed darts do not return upon aging.

Comparative Example 7

In accordance with the process described in Example 1, a pressure sensitive shrink label constructed from a 1.4 mil thick machine direction oriented polyvinyl chloride single layer film designated MF-L243/01 from Kloechner is applied to the bottle having compound curves. High velocity hot air heats the bottle and label to 60° C. The film does not conform to the container. Initial wipe down is poor with many darts formed in all directions. The darts and ridges remain after the application of heat and a second wipe down. The film exhibits excessive shrink back.

Comparative Example 8

In accordance with the process described in Example 1, a pressure sensitive shrink label constructed from a 2.0 mil thick polypropylene multilayer film designated BTNY from Vifan is applied to the bottle having compound curves. High velocity hot air heats the bottle and label to 100° C. The darts formed do not shrink completely at high temperature and do not entirely wipe down flat. The darts return upon aging.

Comparative Example 9

In accordance with the process described in Example 1, a pressure sensitive shrink label constructed from a 3.4 mil thick medium density polyethylene (MDPE) multilayer film designated PE 85 from Charter Films is applied to the bottle having compound curves. High velocity hot air heats the bottle and label to 100° C. The darts formed do not shrink completely at high temperature and do not entirely wipe down flat. The darts return upon aging.

TABLE 1

| Ex. | Grade | Polymer | Film Construction | Process | Suppliers | Gauge | Ult Tensile (PSI) |
|---|---|---|---|---|---|---|---|
| 1 | CorrTuff | LDPE | single layer | double bubble | Sealed Air | 3.0 | 10,000 MD<br>20,000 CD |
| 2 | CZPA 200 | PP | multi-layer | double bubble | Innovia | 2.0 | 20,000 MD<br>22,000 CD |
| 3 | EARTHFIRST PLA | Poly Lactic Acid | single layer | blown | Plastic Suppliers | 2.0 | 8,000 MD<br>8,000 CD |
| Comp. 4 | Med Shrink ROSO Film | PP | single layer | MDO | Avery PPD | 2.0 | — |
| Comp. 5 | Penta Label 2.0 mil OT-M276/41, 71/9400, GLGL | PVC | single layer | TDO | Kloeckner | 1.9 | 7,200 MD<br>16,900 CD |
| Comp. 6 | Fusion 2.0 mil 1775E | PETG | single layer | TDO | Mitsubishi | 2.0 | 7,250 MD<br>29,000 CD |
| Comp. 7 | MF-L243/01 WHT 03/402-B | PVC | single layer | MDO | Kloeckner | 1.4 | — |
| Comp. 8 | BTNY | PP | multi-layer | tenter | Vifan | 2.0 | 40,000 MD<br>20,000 CD |
| Comp. 9 | PE 85 | MDPE | multi-layer | blown | Charter Films | 3.4 | 3,000 MD<br>3,500 CD |

| Ex. | Modulus (PSI) | L&W Stiffness (mN) | Shrink: MD | Shrink: TD | Adhesive | Liner |
|---|---|---|---|---|---|---|
| 1 | 30,000 MD<br>30,000 CD | 26 MD<br>24 CD | 40% (106 C.)<br>70% (120 C.) | 49% (106 C.)<br>69% (120 C.) | S692N | BG40 glassine |
| 2 | 100,000 MD<br>130,000 CD | 24 MD<br>18 CD | 10% (106 C.)<br>14% (120 C.) | 0% (106 C.)<br>10% (120 C.) | S692N | 1.2 mil PET |
| 3 | 300,000 MD<br>300,000 CD | 44 MD<br>60 CD | 7% (106 C.)<br>8% (120 C.) | 12% (106 C.)<br>14% (120 C.) | S692N | 1.2 mil PET |
| Comp. 4 | 200,000 MD<br>123,000 CD | 30 MD<br>26 CD | 14% (106 C.)<br>23% (120 C.) | 0% (106 C.)<br>0% (120 C.) | S692N | 1.2 mil PET |
| Comp. 5 | — | 52 MD<br>36 CD | 4% (106 C.) | 56% (106 C.) | S692N | BG40 glassine |
| Comp. 6 | — | 70 MD<br>30 CD | 6% (106 C.) | 66% (106 C.) | S692N | BG40 glassine |
| Comp. 7 | 220,000 MD<br>150,000 CD | — | 41% (106 C.)<br>45% (120 C.) | 0% (106 C.)<br>+3% (120 C.) | S3506 | 1.2 mil PET |

TABLE 1-continued

| | | | | | | |
|---|---|---|---|---|---|---|
| Comp. 8 | — | 35 MD 65 CD | 2% (106 C.) 2% (120 C.) | 0% (106 C.) 2% (120 C.) | S692N | BG40 glassine |
| Comp. 9 | 75,000 MD 60,000 CD | 40 MD 50 CD | 0% (106 C.) 4% (120 C.) | 0% (106 C.) 0% (120 C.) | S692N | BG40 glassine |

While the invention has been explained in relation to its preferred embodiments, it is to be understood that various modifications thereof will become apparent to those skilled in the art upon reading the specification. Therefore, it is to be under stood that the invention disclosed herein is intended to cover such modifications as fall within the scope of the appended claims.

What is claimed is:

1. A method of applying a label to an article, the method comprising:
   providing an article having a perimeter and having a surface comprising at least one compound curve;
   providing a label comprising (i) a heat shrinkable film having an inner surface and an outer surface; and (ii) a layer of pressure sensitive adhesive on the inner surface of the heat shrinkable film, wherein the label has a first edge and a contact region;
   contacting the adhesive layer in the contact region of the label with the article;
   applying heat and pressure simultaneously to the label in a direction from the contact region to the first edge such that the first edge of the label adheres to the article and the label shrinks to conform to the compound curve of the article;
   wherein the label adheres to less than half the perimeter of the article at a given cross-section.

2. The method of claim 1 wherein heat and pressure are applied by a walking beam comprising a heated bladder.

3. The method of claim 1 wherein heat and pressure are applied by a walking beam comprising a heated cavity wherein the shape of the cavity corresponds to the shape of the article to which the label is applied.

4. The method of claim 1 wherein heat and pressure are applied by a walking beam comprising a flexible heated membrane suspended between at least two frame members.

5. The method of claim 1 wherein heat and pressure are applied by a walking beam comprising a flexible heated membrane mounted to a rectangular frame.

6. The method of claim 1 wherein heat and pressure are applied by a walking beam comprising a flexible heated membrane mounted to a frame having a shape corresponding to the shape of the article to which the label is applied.

7. The method of claim 1 wherein heat and pressure are applied by a walking beam comprising a flexible porous mesh suspended between at least two frame members.

8. The method of claim 1 wherein heat and pressure are applied by a flexible, expandable heated membrane.

9. The method of claim 1 wherein the label is provided with a release liner adhered to the adhesive layer and the method further comprises separating the release liner from the label prior to contacting the label with the article.

10. The method of claim 1 wherein the label is heated to a temperature of at least 40° C.

11. The method of claim 1 wherein the heat shrinkable film comprises a film selected from polyester, polyolefin, polyvinyl chloride, polystyrene, polylactic acid, copolymers thereof and blends thereof.

12. The method of claim 1 wherein the heat shrinkable film comprises a polyolefin.

13. The method of claim 1 wherein the heat shrinkable film comprises a multilayer film having a core layer and at least one skin layer.

14. The method of claim 1 wherein the stiffness of the film is at least 5 mN in the machine direction.

15. The method of claim 1 wherein the label further comprises a print layer between the heat shrinkable film and the adhesive layer, wherein the heat shrinkable film is transparent.

16. The method of claim 1 wherein the label further comprises a print layer on the outer surface of the heat shrinkable film.

17. The method of claim 16 wherein the label further comprises a protective layer overlying the print layer.

18. The method of claim 1 wherein the adhesive layer comprises an emulsion adhesive.

19. The method of claim 1 wherein the adhesive layer comprises a hot melt adhesive.

20. The method of claim 1 wherein the adhesive layer comprises a solvent based adhesive.

21. The method of claim 1 wherein the pressure sensitive adhesive layer is continuous.

22. The method of claim 1 wherein the pressure sensitive adhesive layer is patterned and the pattern substantially covers the inner surface of the film wherein the pattern is continuous over the film surface.

23. The method of claim 1 wherein the label comprises a center and a second edge opposite the first edge, and the contact region is proximate to or in the center of the label.

24. The method of claim 1 wherein the label comprises a second edge opposite the first edge and the contact region is proximate to the second edge of the label.

25. The method of claim 1 wherein heat and pressure is applied by a heated conformable membrane.

* * * * *